US011769056B2

(12) United States Patent
Banerjee et al.

(10) Patent No.: US 11,769,056 B2
(45) Date of Patent: Sep. 26, 2023

(54) SYNTHETIC DATA FOR NEURAL NETWORK TRAINING USING VECTORS

(71) Applicant: Affectiva, Inc., Boston, MA (US)

(72) Inventors: Sandipan Banerjee, Boston, MA (US); Rana el Kaliouby, Milton, MA (US); Ajjen Das Joshi, Arlington, MA (US); Survi Kyal, Chestnut Hill, MA (US); Taniya Mishra, New York, NY (US)

(73) Assignee: Affectiva, Inc., Boston, MA (US)

( * ) Notice: Subject to any disclaimer, the term of this patent is extended or adjusted under 35 U.S.C. 154(b) by 202 days.

(21) Appl. No.: 17/136,083

(22) Filed: Dec. 29, 2020

(65) Prior Publication Data

US 2021/0201003 A1    Jul. 1, 2021

Related U.S. Application Data

(60) Provisional application No. 63/083,136, filed on Sep. 25, 2020, provisional application No. 63/071,401,
(Continued)

(51) Int. Cl.
*G06N 3/084* (2023.01)
*G06N 3/08* (2023.01)
(Continued)

(52) U.S. Cl.
CPC .......... *G06N 3/084* (2013.01); *G06F 18/214* (2023.01); *G06N 3/045* (2023.01); *G06N 3/08* (2013.01);
(Continued)

(58) Field of Classification Search
CPC .. G06V 40/174; G06V 40/169; G06V 40/165; G06V 40/179; G06K 9/6256; G06N 3/0454; G06N 3/08
See application file for complete search history.

(56) References Cited

U.S. PATENT DOCUMENTS 3,034,500 A    5/1962   Backster, Jr.
3,548,806 A    12/1970  Fisher
(Continued)

FOREIGN PATENT DOCUMENTS

JP           08115367       7/1996
KR    10-2005-0021759 A    3/2005
(Continued)

OTHER PUBLICATIONS

Zhu, Xinyue, et al. "Emotion classification with data augmentation using generative adversarial networks." Pacific-Asia conference on knowledge discovery and data mining. Springer, Cham, 2018. (Year: 2018).*
(Continued)

*Primary Examiner* — Utpal D Shah
(74) *Attorney, Agent, or Firm* — Adams Intellex, PLC

(57) ABSTRACT

Machine learning is performed using synthetic data for neural network training using vectors. Facial images are obtained for a neural network training dataset. Facial elements from the facial images are encoded into vector representations of the facial elements. A generative adversarial network (GAN) generator is trained to provide one or more synthetic vectors based on the one or more vector representations, wherein the one or more synthetic vectors enable avoidance of discriminator detection in the GAN. The training a GAN further comprises determining a generator accuracy using the discriminator. The generator accuracy can enable a classifier, where the classifier comprises a multi-layer perceptron. Additional synthetic vectors are generated in the GAN, wherein the additional synthetic vectors avoid discriminator detection. A machine learning neural network is trained using the additional synthetic vectors. The training a machine learning neural network further includes using the one or more synthetic vectors.

25 Claims, 12 Drawing Sheets

Related U.S. Application Data filed on Aug. 28, 2020, provisional application No. 62/955,493, filed on Dec. 31, 2019, provisional application No. 62/954,819, filed on Dec. 30, 2019, provisional application No. 62/954,833, filed on Dec. 30, 2019.

(51) Int. Cl.

| | | |
|---|---|---|
| *G06V 40/16* | (2022.01) | |
| *G06N 3/045* | (2023.01) | |
| *G06V 10/774* | (2022.01) | |
| *G06F 18/214* | (2023.01) | |
| *G06V 10/82* | (2022.01) | |

(52) U.S. Cl.

CPC ............ *G06V 10/774* (2022.01); *G06V 10/82* (2022.01); *G06V 40/16* (2022.01); *G06V 40/165* (2022.01); *G06V 40/169* (2022.01); *G06V 40/174* (2022.01); *G06V 40/179* (2022.01)

(56) References Cited

U.S. PATENT DOCUMENTS

| | | |
|---|---|---|
| 3,870,034 A | 3/1975 | James |
| 4,353,375 A | 10/1982 | Colburn et al. |
| 4,448,203 A | 5/1984 | Williamson et al. |
| 4,794,533 A | 12/1988 | Cohen |
| 4,807,642 A | 2/1989 | Brown |
| 4,817,628 A | 4/1989 | Zealear et al. |
| 4,950,069 A | 8/1990 | Hutchinson |
| 4,964,411 A | 10/1990 | Johnson et al. |
| 5,016,282 A | 5/1991 | Tomono et al. |
| 5,031,228 A | 7/1991 | Lu |
| 5,219,322 A | 6/1993 | Weathers |
| 5,247,938 A | 9/1993 | Silverstein et al. |
| 5,259,390 A | 11/1993 | Maclean |
| 5,507,291 A | 4/1996 | Stirbl et al. |
| 5,572,596 A | 11/1996 | Wildes et al. |
| 5,619,571 A | 4/1997 | Sandstorm et al. |
| 5,647,834 A | 7/1997 | Ron |
| 5,649,061 A | 7/1997 | Smyth |
| 5,663,900 A | 9/1997 | Bhandari et al. |
| 5,666,215 A | 9/1997 | Fredlund et al. |
| 5,725,472 A | 3/1998 | Weathers |
| 5,741,217 A | 4/1998 | Gero |
| 5,760,917 A | 6/1998 | Sheridan |
| 5,762,611 A | 6/1998 | Lewis et al. |
| 5,772,508 A | 6/1998 | Sugita et al. |
| 5,772,591 A | 6/1998 | Cram |
| 5,774,591 A | 6/1998 | Black et al. |
| 5,802,220 A | 9/1998 | Black et al. |
| 5,825,355 A | 10/1998 | Palmer et al. |
| 5,886,683 A | 3/1999 | Tognazzini et al. |
| 5,898,423 A | 4/1999 | Tognazzini et al. |
| 5,920,477 A | 7/1999 | Hoffberg et al. |
| 5,945,988 A | 8/1999 | Williams et al. |
| 5,959,621 A | 9/1999 | Nawaz et al. |
| 5,969,755 A | 10/1999 | Courtney |
| 5,983,129 A | 11/1999 | Cowan et al. |
| 5,987,415 A | 11/1999 | Breese et al. |
| 6,004,061 A | 12/1999 | Manico et al. |
| 6,004,312 A | 12/1999 | Finneran et al. |
| 6,008,817 A | 12/1999 | Gilmore, Jr. |
| 6,026,321 A | 2/2000 | Miyata et al. |
| 6,026,322 A | 2/2000 | Korenman et al. |
| 6,056,781 A | 5/2000 | Wassick et al. |
| 6,067,565 A | 5/2000 | Horvitz |
| 6,088,040 A | 7/2000 | Oda et al. |
| 6,091,334 A | 7/2000 | Galiana et al. |
| 6,099,319 A | 8/2000 | Zaltman et al. |
| 6,134,644 A | 10/2000 | Mayuzumi et al. |
| 6,182,098 B1 | 1/2001 | Selker |
| 6,185,534 B1 | 2/2001 | Breese et al. |
| 6,195,651 B1 | 2/2001 | Handel et al. |
| 6,212,502 B1 | 4/2001 | Ball et al. |
| 6,222,607 B1 | 4/2001 | Szajewski et al. |
| 6,309,342 B1 | 10/2001 | Blazey et al. |
| 6,327,580 B1 | 12/2001 | Pierce et al. |
| 6,349,290 B1 | 2/2002 | Horowitz et al. |
| 6,351,273 B1 | 2/2002 | Lemelson et al. |
| 6,437,758 B1 | 8/2002 | Nielsen et al. |
| 6,443,840 B2 | 9/2002 | Von Kohorn |
| 6,530,082 B1 | 3/2003 | Del Sesto et al. |
| 6,577,329 B1 | 6/2003 | Flickner et al. |
| 6,606,102 B1 | 8/2003 | Odom |
| 6,629,104 B1 | 9/2003 | Parulski et al. |
| 6,792,458 B1 | 9/2004 | Muret et al. |
| 6,847,376 B2 | 1/2005 | Engeldrum et al. |
| 7,003,135 B2 | 2/2006 | Hsieh et al. |
| 7,013,478 B1 | 3/2006 | Hendricks et al. |
| 7,113,916 B1 | 9/2006 | Hill |
| 7,120,880 B1 | 10/2006 | Dryer et al. |
| 7,197,459 B1 | 3/2007 | Harinarayan et al. |
| 7,233,684 B2 | 6/2007 | Fedorovskaya et al. |
| 7,246,081 B2 | 7/2007 | Hill |
| 7,263,474 B2 | 8/2007 | Fables et al. |
| 7,266,582 B2 | 9/2007 | Stelting |
| 7,307,636 B2 | 12/2007 | Matraszek et al. |
| 7,319,779 B1 | 1/2008 | Mummareddy et al. |
| 7,327,505 B2 | 2/2008 | Fedorovskaya et al. |
| 7,350,138 B1 | 3/2008 | Swaminathan et al. |
| 7,353,399 B2 | 4/2008 | Ooi et al. |
| 7,355,627 B2 | 4/2008 | Yamazaki et al. |
| 7,428,318 B1 | 9/2008 | Madsen et al. |
| 7,474,801 B2 | 1/2009 | Teo et al. |
| 7,496,622 B2 | 2/2009 | Brown et al. |
| 7,549,161 B2 | 6/2009 | Poo et al. |
| 7,551,755 B1 | 6/2009 | Steinberg et al. |
| 7,555,148 B1 | 6/2009 | Steinberg et al. |
| 7,558,408 B1 | 7/2009 | Steinberg et al. |
| 7,564,994 B1 | 7/2009 | Steinberg et al. |
| 7,573,439 B2 | 8/2009 | Lau et al. |
| 7,580,512 B2 | 8/2009 | Batni et al. |
| 7,584,435 B2 | 9/2009 | Bailey et al. |
| 7,587,068 B1 | 9/2009 | Steinberg et al. |
| 7,610,289 B2 | 10/2009 | Muret et al. |
| 7,620,934 B2 | 11/2009 | Falter et al. |
| 7,644,375 B1 | 1/2010 | Anderson et al. |
| 7,676,574 B2 | 3/2010 | Glommen et al. |
| 7,757,171 B1 | 7/2010 | Wong et al. |
| 7,826,657 B2 | 11/2010 | Zhang et al. |
| 7,830,570 B2 | 11/2010 | Morita et al. |
| 7,881,493 B1 | 2/2011 | Edwards et al. |
| 7,921,036 B1 | 4/2011 | Sharma |
| 8,010,458 B2 | 8/2011 | Galbreath et al. |
| 8,022,831 B1 | 9/2011 | Wood-Eyre |
| 8,219,438 B1 | 7/2012 | Moon et al. |
| 8,401,248 B1 | 3/2013 | Moon et al. |
| 8,442,638 B2 | 5/2013 | Libbus et al. |
| 8,522,779 B2 | 9/2013 | Lee et al. |
| 8,600,120 B2 | 12/2013 | Gonion et al. |
| 8,640,021 B2 | 1/2014 | Perez et al. |
| 8,775,332 B1 | 7/2014 | Morris et al. |
| 8,861,842 B2 | 10/2014 | Jung et al. |
| 8,898,093 B1 | 11/2014 | Helmsen |
| 8,949,170 B2 | 2/2015 | Zadeh |
| 9,008,391 B1 | 4/2015 | Solanki et al. |
| 9,246,688 B1 | 1/2016 | Stickle |
| 9,275,269 B1 | 3/2016 | Li et al. |
| 9,275,347 B1 | 3/2016 | Haranda et al. |
| 9,286,524 B1 | 3/2016 | Mei et al. |
| 10,322,728 B1 | 6/2019 | Porikli et al. |
| 2001/0033286 A1 | 10/2001 | Stokes et al. |
| 2001/0041021 A1 | 11/2001 | Boyle et al. |
| 2002/0007249 A1 | 1/2002 | Cranley |
| 2002/0030665 A1 | 3/2002 | Ano |
| 2002/0042557 A1 | 4/2002 | Bensen et al. |
| 2002/0054174 A1 | 5/2002 | Abbott et al. |
| 2002/0084902 A1 | 7/2002 | Zadrozny et al. |
| 2002/0171551 A1 | 11/2002 | Eshelman |
| 2002/0182574 A1 | 12/2002 | Freer |
| 2003/0035567 A1 | 2/2003 | Chang et al. |

(56) References Cited

U.S. PATENT DOCUMENTS

| | | |
|---|---|---|
| 2003/0037041 A1 | 2/2003 | Hertz |
| 2003/0060728 A1 | 3/2003 | Mandigo |
| 2003/0093784 A1 | 5/2003 | Dimitrova et al. |
| 2003/0182123 A1 | 9/2003 | Mitsuyoshi |
| 2003/0191682 A1 | 10/2003 | Shepard et al. |
| 2003/0191816 A1 | 10/2003 | Landress et al. |
| 2004/0181457 A1 | 9/2004 | Biebesheimer |
| 2005/0187437 A1 | 8/2005 | Matsugu |
| 2005/0283055 A1 | 12/2005 | Shirai et al. |
| 2005/0289582 A1 | 12/2005 | Tavares et al. |
| 2006/0019224 A1 | 1/2006 | Behar et al. |
| 2006/0143647 A1 | 6/2006 | Bill |
| 2006/0170945 A1 | 8/2006 | Bill |
| 2006/0235753 A1 | 10/2006 | Kameyama |
| 2007/0167689 A1 | 7/2007 | Ramadas et al. |
| 2007/0173733 A1 | 7/2007 | Le et al. |
| 2007/0239787 A1 | 10/2007 | Cunningham et al. |
| 2007/0255831 A1 | 11/2007 | Hayashi et al. |
| 2007/0265507 A1 | 11/2007 | de Lemos |
| 2007/0299964 A1 | 12/2007 | Wong et al. |
| 2008/0059570 A1 | 3/2008 | Bill |
| 2008/0091512 A1 | 4/2008 | Marci et al. |
| 2008/0091515 A1 | 4/2008 | Thieberger et al. |
| 2008/0101660 A1 | 5/2008 | Seo |
| 2008/0103784 A1 | 5/2008 | Wong et al. |
| 2008/0167757 A1 | 7/2008 | Kanevsky et al. |
| 2008/0184170 A1 | 7/2008 | Periyalwar |
| 2008/0201144 A1 | 8/2008 | Song et al. |
| 2008/0208015 A1 | 8/2008 | Morris et al. |
| 2008/0221472 A1 | 9/2008 | Lee et al. |
| 2008/0287821 A1 | 11/2008 | Jung et al. |
| 2008/0292151 A1 | 11/2008 | Kurtz et al. |
| 2009/0002178 A1 | 1/2009 | Guday et al. |
| 2009/0006206 A1 | 1/2009 | Groe |
| 2009/0083421 A1 | 3/2009 | Glommen et al. |
| 2009/0094286 A1 | 4/2009 | Lee et al. |
| 2009/0112694 A1 | 4/2009 | Jung et al. |
| 2009/0112810 A1 | 4/2009 | Jung et al. |
| 2009/0133048 A1 | 5/2009 | Gibbs et al. |
| 2009/0150919 A1 | 6/2009 | Lee et al. |
| 2009/0156907 A1 | 6/2009 | Jung et al. |
| 2009/0164132 A1 | 6/2009 | Jung et al. |
| 2009/0193344 A1 | 7/2009 | Smyers |
| 2009/0210290 A1 | 8/2009 | Elliott et al. |
| 2009/0217315 A1 | 8/2009 | Malik et al. |
| 2009/0259518 A1 | 10/2009 | Harvey |
| 2009/0270170 A1 | 10/2009 | Patton |
| 2009/0271417 A1 | 10/2009 | Toebes et al. |
| 2009/0285456 A1 | 11/2009 | Moon et al. |
| 2009/0299840 A1 | 12/2009 | Smith |
| 2010/0070523 A1 | 3/2010 | Delgo et al. |
| 2010/0086215 A1 | 4/2010 | Bartlett et al. |
| 2010/0099955 A1 | 4/2010 | Thomas et al. |
| 2010/0266213 A1 | 10/2010 | Hill |
| 2010/0274847 A1 | 10/2010 | Anderson et al. |
| 2010/0324437 A1 | 12/2010 | Freeman |
| 2011/0007174 A1 | 1/2011 | Bacivarov et al. |
| 2011/0126226 A1 | 5/2011 | Makhlouf |
| 2011/0134026 A1 | 6/2011 | Kang et al. |
| 2011/0143728 A1 | 6/2011 | Holopainen et al. |
| 2011/0144971 A1 | 6/2011 | Danielson |
| 2011/0196855 A1 | 8/2011 | Wable et al. |
| 2011/0231240 A1 | 9/2011 | Schoen et al. |
| 2011/0251493 A1 | 10/2011 | Poh et al. |
| 2011/0255741 A1 | 10/2011 | Jung et al. |
| 2011/0263946 A1 | 10/2011 | el Kaliouby et al. |
| 2012/0271484 A1 | 10/2012 | Feit et al. |
| 2012/0324491 A1 | 12/2012 | Bathiche et al. |
| 2013/0023337 A1 | 1/2013 | Bowers et al. |
| 2013/0116587 A1 | 5/2013 | Sommo et al. |
| 2013/0197409 A1 | 8/2013 | Baxter et al. |
| 2014/0172910 A1 | 6/2014 | Jung et al. |
| 2014/0188462 A1 | 7/2014 | Zadeh |
| 2014/0201126 A1 | 7/2014 | Zadeh et al. |
| 2014/0222425 A1 | 8/2014 | Park et al. |
| 2014/0276090 A1 | 9/2014 | Breed |
| 2014/0372159 A1 | 12/2014 | Bain |
| 2014/0372344 A1 | 12/2014 | Morris et al. |
| 2015/0006443 A1 | 1/2015 | Rose et al. |
| 2015/0139485 A1 | 5/2015 | Bourdev |
| 2015/0149155 A1 | 5/2015 | Zadeh |
| 2015/0254555 A1 | 9/2015 | Williams, Jr. et al. |
| 2015/0293976 A1 | 10/2015 | Guo et al. |
| 2015/0310862 A1 | 10/2015 | Dauphin et al. |
| 2015/0324690 A1 | 11/2015 | Chilimbi et al. |
| 2015/0347820 A1 | 12/2015 | Yin et al. |
| 2016/0078863 A1 | 3/2016 | Chung et al. |
| 2016/0104486 A1 | 4/2016 | Penilla et al. |
| 2017/0003784 A1 | 1/2017 | Garg et al. |
| 2017/0297587 A1 | 10/2017 | Mimura et al. |
| 2018/0050696 A1 | 2/2018 | Misu et al. |
| 2018/0251122 A1 | 9/2018 | Golston et al. |
| 2019/0049965 A1 | 2/2019 | Tanriover |
| 2019/0135325 A1 | 5/2019 | Lisseman et al. |
| 2019/0225232 A1 | 7/2019 | Blau |
| 2019/0279009 A1* | 9/2019 | Srirangam Narashiman ............... G06T 7/74 |
| 2020/0103980 A1 | 4/2020 | Katz et al. |
| 2020/0171977 A1 | 6/2020 | Jales Costa et al. |
| 2020/0223362 A1 | 7/2020 | Witte |
| 2020/0285871 A1 | 9/2020 | Tokizaki et al. |
| 2020/0130528 A1 | 10/2020 | Upmanue et al. |
| 2021/0065881 A1* | 3/2021 | Sargent ................... G06T 11/60 |
| 2021/0241011 A1* | 8/2021 | Cronje ..................... B60Q 9/00 |
| 2021/0248400 A1* | 8/2021 | Cronje ................... G06N 3/084 |

FOREIGN PATENT DOCUMENTS

| | | |
|---|---|---|
| KR | 10-2008-0016303 A | 2/2008 |
| KR | 1020100048688 A | 5/2010 |
| WO | WO 2011/045422 A1 | 4/2011 |

OTHER PUBLICATIONS

Guo, Jing-Ming, and Herleeyandi Markoni. "Driver drowsiness detection using hybrid convolutional neural network and long short-term memory." Multimedia tools and applications 78.20 (2019): 29059-29087. (Year: 2019).*

Rana Ayman El Kaliouby, Mind-reading machines: automated inference of complex mental states, Jul. 2005, University of Cambridge, Cambridge, United Kingdom.

International Search Report dated Nov. 14, 2011 for PCT/US2011/39282.

International Search Report dated Apr. 16, 2012 for PCT/US2011/054125.

International Search Report dated May 24, 2012 for PCT/US2011/060900.

Xiaoyu Wang, An HOG-LBP human detector with partial occlusion handling, Sep. 29, 2009, IEEE 12th International Conference on Computer Vision, Kyoto, Japan.

Zhihong Zeng, A Survey of Affect Recognition Methods: Audio, Visual, and Spontaneous Expressions, Jan. 2009, IEEE Transactions on Pattern Analysis and Machine Intelligence, vol. 31, No. 1.

Nicholas R. Howe and Amanda Ricketson, Improving the Boosted Correlogram, 2004, Lecture Notes in Computer Science, ISSN 0302-9743, Springer-Verlag, Germany.

Xuming He, et al, Learning and Incorporating Top-Down Cues in Image Segmentation, 2006, Lecture Notes in Computer Science, ISBN 978-3-540-33832-1, Springer-Verlag, Germany.

Ross Eaton, et al, Rapid Training of Image Classifiers through Adaptive, Multi-frame Sampling Methods, Oct. 2008, IEEE 37th Applied Imagery Pattern Recognition Workshop, Washington DC.

Verkruysse, Wim, Lars O. Svaasand, and J. Stuart Nelson. "Remote plethysmographic imaging using ambient light." Optics express 16.26 (2008): 21434-21445.

Albiol, Alberto, et al. "Face recognition using HOG-EBGM." Pattern Recognition Letters 29.10 (2008): 1537-1543.

Fasel, B. (Aug. 2002). Robust face analysis using convolutional neural networks. In Object recognition supported by user interaction for service robots (vol. 2, pp. 40-43). IEEE.

(56) References Cited

OTHER PUBLICATIONS

Matsugu, M., Mori, K., Mitari, Y., & Kaneda, Y. (2003). Subject independent facial expression recognition with robust face detection using a convolutional neural network. Neural Networks, 16(5-6), 555-559.

Lawrence, S., Giles, C. L., Tsoi, A. C., & Back, A. D. (1997). Face recognition: A convolutional neural-network approach. IEEE transactions on neural networks, 8(1), 98-113.

Nebauer, C. (1998). Evaluation of convolutional neural networks for visual recognition. IEEE transactions on neural networks, 9(4), 685-696.

Ahmed, A., Yu, K., Xu, W., Gong, Y., & Xing, E. (Oct. 2008). Training hierarchical feed-forward visual recognition models using transfer learning from pseudo-tasks. In European Conference on Computer Vision (pp. 69-82). Springer, Berlin, Heidelberg.

Bass, C., Dai, T., Billot, B., Arulkumaran, K., Creswell, A., Clopath, C., . . . & Bharath, A. A. (May 2019). Image synthesis with a convolutional capsule generative adversarial network. In International Conference on Medical Imaging with Deep Learning (pp. 39-62). PMLR.

\* cited by examiner

SYNTHETIC DATA FOR NEURAL NETWORK TRAINING USING VECTORS

RELATED APPLICATIONS

This application claims the benefit of U.S. provisional patent applications "Synthetic Data Augmentation for Neural Network Training" Ser. No. 62/954,819, filed Dec. 30, 2019, "Synthetic Data for Neural Network Training Using Vectors" Ser. No. 62/954,833, filed Dec. 30, 2019, "Autonomous Vehicle Control Using Longitudinal Profile Generation" Ser. No. 62/955,493, filed Dec. 31, 2019, "Neural Network Synthesis Architecture Using Encoder-Decoder Models" Ser. No. 63/071,401, filed Aug. 28, 2020, and "Neural Network Training with Bias Mitigation" Ser. No. 63/083,136, filed Sep. 25, 2020.

FIELD OF ART

This application relates generally to machine learning and more particularly to synthetic data for neural network training using vectors.

BACKGROUND

Various external stimuli that are experienced by an individual can induce a wide range of responses. The responses of the individual can manifest as cognitive states, mental or emotional states, facial expressions, body language, and so on. The stimuli, which are experienced through one or more senses, can be visual, aural, olfactory, tactile, and so on. The various stimuli, whether perceived alone or in combination, can evoke strong cognitive states or emotions in the individual. Not all individuals who experience the stimuli will react in a similar manner. That is, when a group of individuals experiences the stimuli, the reactions of the individuals can be at times substantially similar, while at other times, widely dissimilar. How an individual reacts to experienced stimuli can be important to defining the "essence" or character of that individual. Further, the responses of the individual to the stimuli can have a profound impact on the cognitive states experienced by that individual. The cognitive states experienced by an individual in response to external stimuli can vary depending on time frames. The time frames can be one time of day or another, one day of the week or month versus another, and so on. The general well-being of an individual can directly result from cognitive state. Cognitive state further impacts her or his perception of the surrounding environment, decision-making processes, and so on. The cognitive states that result from a common event experienced by multiple individuals can carry a collective importance which is more impactful than that of each individual's cognitive state.

Facial expressions and speech are visible and audible cues that are foundational to human communication. The human face can assume various facial expressions, consciously and unconsciously. The facial expressions convey basic information such as mental states, moods, emotions, etc. The facial expressions are formed by physical movements or positions of facial muscles. The muscles movements and positions form expressions that convey emotions ranging from happy to sad, and create expressions of anger, fear, disgust, surprise, and many others. The facial expressions of a given person can be captured and analyzed for various purposes including facial recognition, identity confirmation, and determination of emotions and mental states. The mental states include frustration, ennui, confusion, cognitive overload, skepticism, delight, satisfaction, calmness, stress, and many others. The human voice can also be captured and analyzed. Based on characteristics of the voice, including timbre, prosody, vocal register, vocal resonance, pitch, loudness, speech rate, and language content, the human voice further conveys critical information relating to mental states, moods, emotions, etc. Nonverbal communication also occurs between and among people. Nonverbal communication supplements and enhances verbal communication, and can be categorized as visual cues, distance cues, voice cues, and touch cues. Visual cues often include body language and facial expressions. An angry face and a smiling face convey opposite messages. Physical distance cues are also informative. Towering over another person threatens, while sitting with the person reassures. Voice cues, called paralanguage, include rate, pitch, volume, voice quality, or prosody. Touch or haptic cues can also be used for nonverbal communication.

SUMMARY

In disclosed techniques, machine learning is accomplished using one or more neural networks. The neural networks can include generator neural networks and discriminator neural networks within one or more generative adversarial networks (GANs). The generator tries to create data, called synthetic data, which is able to fool the discriminator into thinking that the data is real. The discriminator tries to detect all synthetic data and label the synthetic data as fake. These adversarial roles of the generator and discriminator enable improved generation of synthetic data. The synthetic data is used to enhance training of the machine learning neural network. The neural network training can be based on adjusting weights and biases associated with layers, such as hidden layers, within the neural network. The results of the neural network training based on the augmenting with the synthetic data can be used to further train the neural network, or can be used to train an additional neural network such as a production neural network. The training can be based on determinations that include true/false, real/fake, and so on. The trained neural network can be applied to a variety of analysis tasks including analysis of facial elements, facial expressions, cognitive states, mental states, emotional states, moods, and so on. An individual can experience one or more states, such as cognitive states, while she or he is interacting with an electronic device, consuming a media presentation, traveling within a vehicle, interacting with an object within the vehicle, and so on. The electronic device can include a personal electronic device such as a cell phone or a computing device. The analysis that can be performed can be based on the neural network training. A neural network, such as a convolutional neural network, a recurrent neural network, and so on, can be used to perform machine learning, deep learning, etc. A neural network for machine or deep learning can be trained by using a machine learning system to process training data. The training data can include one or more sets of training data. The training data comprises "known good" data, where the known good data includes previously analyzed input data and expected results from analyzing the input data. The input data can include images, audio, or physiological data, and the expected results can include one or more of facial expressions, cognitive states, human perception states, emotional states, moods, etc. The expected results can further include identified faces or voices.

The known good data is processed by the machine learning system in order to adjust weights associated with various layers within the neural network. The adjustments of weights can include weights associated with the GAN, a deep learning neural network, and so on. Additional adjustments to the training of the neural network can be accomplished by applying further known good data and adjusting additional weights. In embodiments, the training data, which can include vector representations encoded from facial images, is augmented with generated synthetic vectors. The generated synthetic vectors can augment sparse classes of facial elements within a given training dataset. Once trained, the deep learning neural network can be used to analyze further data. The further data can include facial element data within images, voices within audio data, respiratory rates within physiological data, etc. As the neural network is being trained, additional synthetic data such as synthetic vectors can be generated. The synthetic data can be created, filtered, supplemented, modified, and so on. The synthetic data that can be generated to augment the training dataset can be received from a generative adversarial network, or GAN. The results of training the neural network with the training dataset and the augmented training dataset can be used to train further neural networks.

Facial images are obtained for neural network training. The facial images can comprise a facial image training dataset. The training dataset can include data in addition to the facial images data, such as image data that can include torso data, audio data, physiological data, and so on. The training data can be uploaded by a user, downloaded from a library, and so on. The training data can be processed on a machine learning system. The machine learning system can include one or more neural networks such as a deep learning neural network. The deep learning neural network can be based on a convolutional neural network. The training data that is used for neural network training can be annotated, where the annotations to the training data can include text, dates, weights, biases, and so on. The annotating can include adding metadata—data about data—to the training data. The metadata can include training data labeling, a log file, etc. A machine learning neural network is trained using the augmented training data. The neural network can be trained to identify facial elements or facial expressions, to locate faces within images, to identify voices or human-generated sounds within audio, etc. Additional training data is generated for training the neural network. The additional training data can include synthetic vectors generated by the GAN, further facial elements, facial images, audio data, physiological data, and the like.

In embodiments, a computer-implemented method for machine learning comprises: obtaining facial images for a neural network training dataset; encoding facial elements from the facial images into one or more vector representations of the facial elements; training a generative adversarial network (GAN) generator to provide one or more synthetic vectors based on the one or more vector representations, wherein the one or more synthetic vectors enable avoidance of discriminator detection in the GAN; generating additional synthetic vectors in the GAN, wherein the additional synthetic vectors avoid discriminator detection; and training a machine learning neural network, using the additional synthetic vectors. In embodiments, the GAN comprises a generator and a discriminator. The GAN can be optimized, where the optimizing of the GAN comprises a loss feedback to both the discriminator and the generator. In some embodiments, the neural network comprises a classifier. The classifier can be enabled based on accuracy of the generator within the GAN. The classifier can be used to determine a facial element such as a smile, a frown, a smirk, and so on. An intensity of the facial element, such as a strong, moderate, or weak smile, frown, or smirk can also be determined. In further embodiments, the classifier comprises a multilayer perceptron, a convolutional neural network (CNN), and so on. The facial element or elements that are determined can be used to enable vehicle manipulation. The vehicle manipulation can include selecting a media presentation for a person within the vehicle, and can further include adjusting seating, lighting, or temperature. The vehicle manipulation can also include operating the vehicle in autonomous or semi-autonomous mode, and so on. When audio information or physiological information is obtained, the audio information or the physiological information can augment the training of the neural network. The audio information can include speech, non-speech vocalizations, and so on. The non-speech vocalizations can include grunts, yelps, squeals, snoring, sighs, laughter, filled pauses, unfilled pauses, or yawns. Further embodiments include obtaining physiological information and augmenting the training dataset based on the physiological information. The physiological information can include heart rate, heart rate variability, respiration rate, skin conductivity, and so on.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
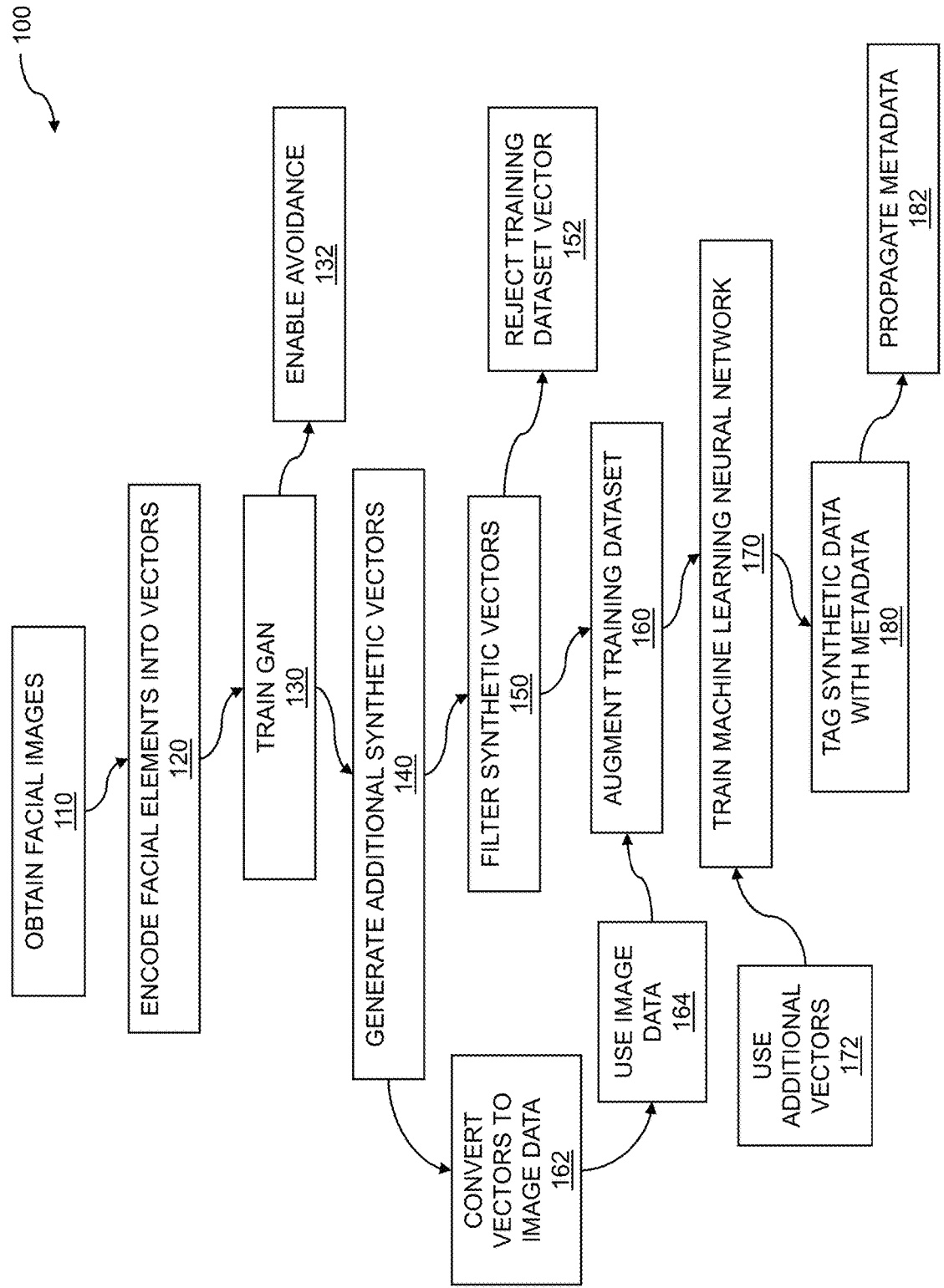
FIG. 1 is a flow diagram for synthetic data for neural network training using vectors.

In the disclosed materials, machine learning is based on a generative adversarial network (GAN). The GAN uses generator and discriminator neural networks which compete with each other in a machine learning technique. Facial elements are encoded from facial images that are obtained for a neural network training dataset. The facial images can contain various facial elements such as facial expressions that can include smiles or frowns, eyebrow furrows, and so on. The facial elements can include human drowsiness features. The facial elements are encoded into vector representations. The generator neural network within the GAN is trained to provide synthetic vectors, where the synthetic vectors resemble the vector representations produced by the encoding. The training of the generator neural network to generate synthetic vectors can be designed to avoid detection by the discriminator neural network. That is, a "good" synthetic vector is indistinguishable by the discriminator from a real vector representation encoded from the facial images. With the generator trained, additional synthetic vectors can be generated in the GAN. The additional synthetic vectors can supplement the vector representations of the facial elements for training a machine learning neural network.

Neural network training is based on techniques such as applying "known good" data to the neural network in order to adjust one or more weights or biases, to add or remove layers, etc., within the neural network. The adjusting weights can be performed to enable applications such as machine vision, machine hearing, and so on. The adjusting weights can be performed to determine facial elements, facial expressions, human perception states, cognitive states, emotional states, moods, etc. In embodiments, the facial elements comprise human drowsiness features. Facial elements can be associated with facial expressions, where the facial expressions can be associated with one or more cognitive states. The various states can be associated with an individual as she or he interacts with an electronic device or a computing device, consumes media, travels in or on a vehicle, and so on. The synthetic data for neural network training uses vectors for machine learning. The machine learning is based on obtaining facial images for a neural network training dataset. A training dataset can include facial element data, facial expression data, facial data, image data, audio data, physiological data, and so on. The images can include video images, still images, intermittently obtained images, and so on. The images can include visible light images, near-infrared light images, etc. Facial elements are encoded from the facial images into one or more vector representations of the facial elements. A generative adversarial network (GAN) generator is trained to provide one or more synthetic vectors based on the one or more vector representations. The training of the GAN generator can be based on training weights. Weights can be trained on a set of layers within the GAN by applying a known good or "training" data set. The weights can be deployed onto nodes within the generator neural network. The generator neural network can include deep learning nodes. The training can include further training or retraining weights. The further training can be accomplished by applying additional training datasets, while the retraining can be accomplished by back-propagating results. The results can be based on an error function. The training can include annotating the training data with metadata where the metadata includes versioning information. Additional training data can be received for the generator neural network, and the versioning information can be modified based on the additional training data.

Training data for training a neural network is obtained. The training data can be processed on a machine learning system. The training data can include facial image data, facial expression data, facial data, voice data, physiological data, and so on. Various components such as imaging components, microphones, sensors, and so on can be used for collecting the data. The imaging components can include cameras, where the cameras can include a video camera, a still camera, a camera array, a plenoptic camera, a web-enabled camera, a visible light camera, a near-infrared (NIR) camera, a heat camera, and so on. The images and/or other data are used to train the neural network. The neural network can be trained for various types of analysis including image analysis, audio analysis, physiological analysis, and the like. The analysis can be performed on the neural network, where the neural network has been trained using machine learning. A deep learning neural network comprises layers, where each layer within the neural network includes nodes. The operation of the deep learning neural network can be modified or adapted by changing the values of weights associated with the nodes within each layer of the neural network. The changing of the weights associated with the nodes and layers within the neural network comprises retraining of the neural network. The retraining can be performed to improve the efficacy of the analysis for facial expressions, cognitive states, etc. The weights that are trained are deployed onto deep learning nodes of a device, such as a user device or a computing device, and the weights can be retrained over time or as necessary. The retraining can result from using further training data such as additional synthetic data including synthetic vectors.

FIG. 1 is a flow diagram for synthetic data for neural network training using vectors. The flow diagram 100 is based on a computer-implemented method for machine learning. The flow 100 includes obtaining facial images 110 for a neural network training dataset. The neural network to be trained can be based on various neural network techniques, configurations, etc. The neural network can be implemented on a machine learning system, where the machine learning system can include a multi-layer perceptron. The facial images training dataset can be uploaded by a user, downloaded from a library or repository over a network, and so on. The facial images training dataset can include one or more facial expressions, where the facial expressions can include one or more facial elements. The facial elements can include a smile, frown, or smirk; an eyebrow furrow; and so on. The facial elements can comprise human drowsiness features. The facial elements can convey one or more cognitive states. The facial elements can indicate mental states such as happy, disgusted, angry, fearful, surprised, sad, and so on. The neural network that can be trained using the facial images training dataset can include a deep learning (DL) neural network, a convolutional neural network (CNN), a recurrent neural network (RNN), and the like. In embodiments, the neural network that is trained can comprise a convolutional neural network or a recurrent neural network within a machine learning system. The machine learning system can be based on an integrated circuit or chip; a computer such as a laptop or desktop computer; or on a personal electronic device such as a smartphone, tablet, or personal digital assistant (PDA), etc. The semiconductor chip can include a standalone chip, a subsystem of a chip, a module of a multi-chip module (MCM), and so on. The semiconductor chip can include a programmable chip such as a programmable logic array (PLA), a programmable logic device (PLD), a field programmable gate array (FPGA), a read only memory (ROM), and so on. The semiconductor chip can include a full-custom chip design. The semiconductor chip can be reprogrammed, reconfigured, etc., "on the fly", in the field, or at any time convenient to the user of the semiconductor chip. The semiconductor chip can be implemented in any semiconductor technology. The machine learning system can include a convolutional neural network (CNN). In other embodiments, a machine learning system can include a multi-layer perceptron. A perceptron can include an algorithm, based on supervised learning, that can be used for learning classifiers.

The flow 100 includes encoding facial elements 120 from the facial images into one or more vector representations of the facial elements. The encoding can be based on applying one or more classifiers for analysis of the facial images. The classifiers, which can be used by a neural network, can pertain to facial expressions, intensities of facial expressions, positions of facial elements, such as an eyebrow in a furrowed position, and so on. The facial expressions and intensities of the facial expressions can include a strong smile, a medium or moderate smile, or a weak smile. Similar facial expressions and intensities can be associated with frowns, smirks, and so on. The encoding can be based on a value, a threshold, a percentage, a binary decision such as yes/no, and the like. In embodiments, the encoding is based on a calculated number. The vector representation can include a vector formed by inserting, concatenating, joining, and so on, the numbers or elements determined by the encoding. The flow 100 includes training a generative adversarial network (GAN) 130 generator to provide one or more synthetic vectors based on the one or more vector representations. A GAN comprises two neural networks: a generator neural network or "generator", and a discriminator neural network or "discriminator". The generator can be used to generate synthetic data such as images, values, vectors, and so on. The discriminator can be used to determine or "discriminate" data. The discriminating includes predicting whether the data is real or synthetic. The generator and the discriminator neural networks work as adversaries. The generator tries to generate synthetic data that the discriminator will predict as "real" data, while the discriminator tries to detect synthetic or "fake" data generated by the generator. In the flow 100, the one or more synthetic vectors enable avoidance 132 of discriminator detection in the GAN. That is, the synthetic vectors that are generated avoid detection as fakes by the discriminator. Embodiments include jointly optimizing the GAN, where the generator and the discriminator can both be optimized.

Noted above, the facial elements can include human drowsiness features. The human drowsiness features can include "soft" or closed eyes, a slack jaw, a partially open mouth, and so on. The drowsiness features can include an inattentive facial expression. In embodiments, the human drowsiness features can be distilled into n-element vectors. The drowsiness features can be based on facial expressions and/or intensities, facial elements, and so on. The sizes of the n-element vectors can be chosen based on design, computational requirements or limitations, and so on. In embodiments, n can be equal to a number of facial element features times a number of statistics for each feature. A fixed number of statistics or a variable number of statistics can be included. In some embodiments, the number of facial element features can be 18, the number of statistics can be 6, and n can be equal to 108. In other embodiments, the GAN can be seeded by a latent random variable. A latent random variable can be inferred based on a mathematical model. In the context of the flow 100, the latent random variable can be targeted for a sparse facial expression within the training dataset. A sparse class of a facial expression can differ from a more abundant class of a facial expression in that the sparse class is uncommon or difficult to identify in potential training image data. For example, while an "alert person" image can be relatively easy to obtain and/or identify, a "drowsy person" image can be much more difficult to obtain and/or identify. The sparse facial expression can include a smile, a frown, a smirk, a neutral expression, etc. The sparse facial expression can comprise a yawn. In other embodiments, the sparse facial expression can include a drowsiness state. An intensity can be associated with the sparse facial expression, including the drowsiness state. In embodiments, the drowsiness state can include one of a slightly drowsy state, a moderately drowsy state, or an extremely drowsy state. The drowsiness state can manifest as distraction, inattention, gaze direction, etc. In embodiments, the drowsiness state can include a non-alert state.

Returning to optimizing the GAN, various techniques can be used for optimizing the GAN, including jointly optimizing the generator and the discriminator. In embodiments, the joint optimization of the GAN comprises a loss feedback to the discriminator and to the generator. In the context of a neural network, a "candidate solution" for a trained neural network can include a set of weights associated with nodes within layers of the neural network. A function such as an objective function can be used to evaluate the candidate solution. The candidate solution can be evaluated or ranked based on a score such as a high score, a low score, and so on. The score can be determined based on minimizing an error, where the minimizing error can be based on a cost function or a loss function. The result of evaluating the loss function can be referred to as the "loss". By feeding the loss back to both the generator and the discriminator, the loss can be minimized and the GAN optimized. The optimizing of the GAN can include locking the generator based on a result of the joint optimization. That is, the weights or other parameters associated with the generator can be locked while the loss is fed back to the discriminator. In embodiments, optimizing the GAN can include locking the discriminator based on a result of the joint optimization. An objective of the optimization can include reducing computational complexity associated with computing the generator neural network or the discriminator neural network. An efficiency value or number can be assigned to a result of the neural network computing. In embodiments, the result comprises a generator efficiency number. Note that the generator for generating synthetic data can include a random generator or a pseudo-random generator. In embodiments, the generating synthetic data is accomplished using a non-random generator.

The flow 100 includes generating additional synthetic vectors 140 in the GAN, where the additional synthetic vectors avoid discriminator detection. Discussed previously, the GAN generator tries to fool the GAN discriminator by generating synthetic data that the discriminator predicts is real, while the discriminator tries to detect that data is synthetic (fake) as opposed to dataset data (real). Having trained the generator to sufficiently fool the discriminator, the generator can generate additional synthetic data including synthetic vectors. The flow 100 includes filtering the synthetic vectors 150. The filtering of the synthetic vectors can be based on the type of facial element or elements represented by the synthetic vectors. The flow 100 includes rejecting at least one training dataset vector 152 generated by the GAN. The rejecting the at least one training dataset vector can include removing the vector from the dataset, deleting the vector, overwriting the vector, and so on. The rejecting the at least one training dataset vector can be based on a value, a threshold, a percentage, and the like. In embodiments, the filtering can be performed before augmenting the training dataset, as discussed below. The filtering can be accomplished using an algorithm, a function, a procedure, etc. In embodiments, the filtering can be performed using a human-based scoring process. The flow 100 includes augmenting the neural network training dataset 160. The augmenting the neural network training dataset can include adding synthetic vectors to the training dataset. Embodiments include converting the additional synthetic vectors into image data 162. The image data can include synthetic image data that can be used for training a neural network for image processing. The image processing can include drowsiness detection. In embodiments, the augmenting the training dataset includes using the image data 164 converted from the additional synthetic vectors.

The flow 100 includes training a machine learning neural network 170. The training the machine learning neural network can be accomplished using the additional synthetic vectors 172. The training the machine learning neural network can be based on using the facial images training dataset, one or more synthetic vectors or converted synthetic images generated by the GAN generator, the augmented training dataset, the filtered training dataset, and so on. The flow 100 includes tagging the synthetic data with metadata 180. The metadata can include training data labeling, a log file, etc. The metadata can include versioning information on the synthetic data. The versioning information can include data ownership and data lineage. The versioning information can provide training data traceability. The flow 100 includes propagating the metadata 182 to the training dataset. The training dataset can include the training dataset that was augmented. The metadata that can be propagated can include labeling or log file metadata. The metadata can also include information related to data ownership, data lineage, or training data traceability, etc. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
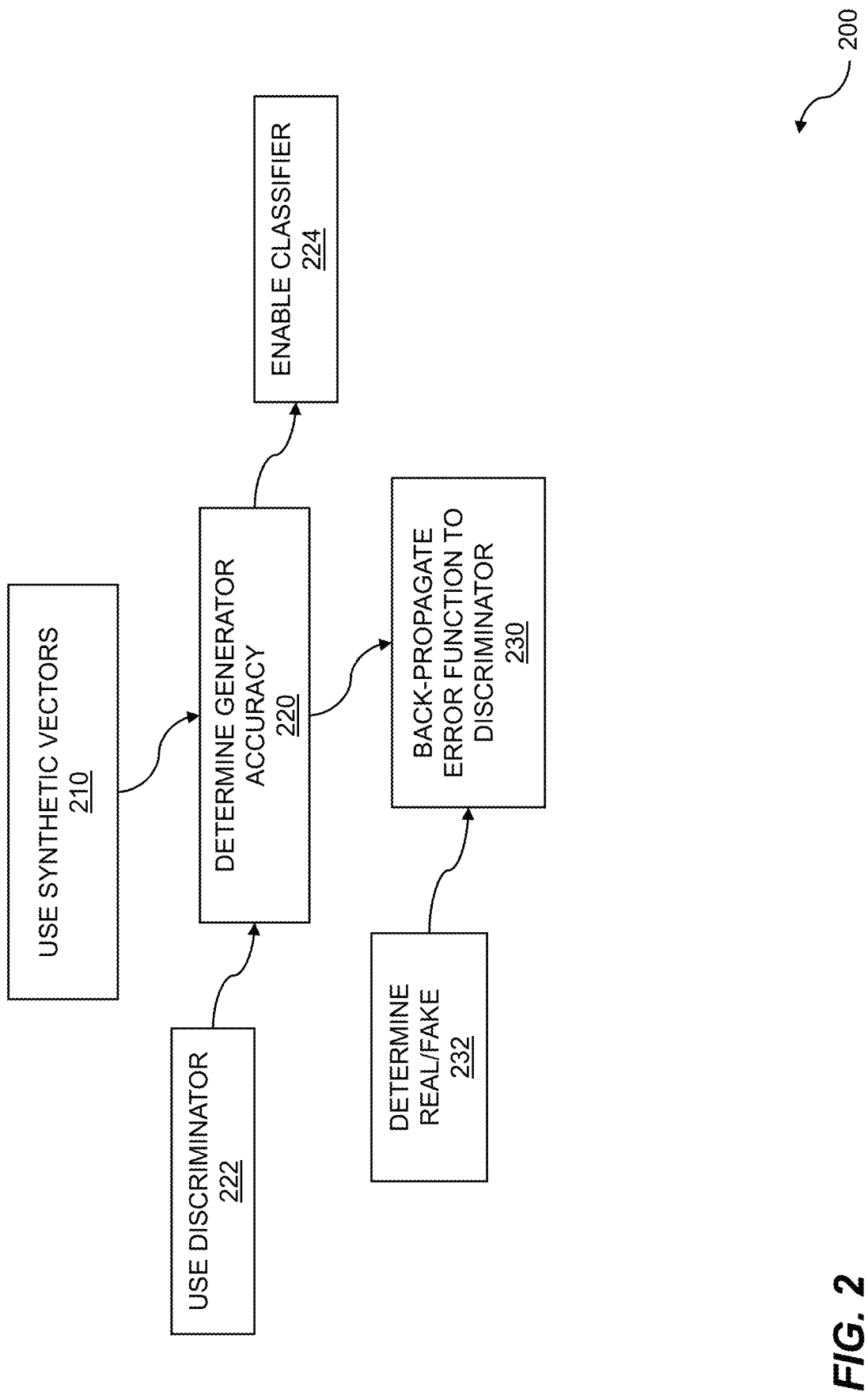
FIG. 2 is a flow diagram for back-propagation.

FIG. 2 is a flow diagram for back-propagation. The flow 200, or portions thereof, can be implemented using one or more computers, processors, personal electronic devices, and so on. The flow 200 can be implemented using one or more neural networks. The flow 200 describes further training a GAN by generating synthetic vectors, evaluating an accuracy of the generated synthetic vectors, and improving the efficacy of the generation of the synthetic vectors by back-propagating an error function. The training the GAN can be based on facial elements of one or more people. In embodiments, the one or more people can be within one or more vehicles. The facial elements can comprise human drowsiness features. The back-propagating is based on synthetic data for neural network training using vectors. In the flow 200, the training a machine learning neural network further comprises using the one or more synthetic vectors 210. Discussed throughout, the synthetic vectors that can be generated can be based on classifying facial elements within facial images. The facial elements can include facial expressions such as smiles, frowns, smirks, or neutral expressions. The facial elements can include eyebrow furrows, head tilt, gaze direction, etc.

In the flow 200, the training a GAN further comprises determining a generator accuracy using the discriminator 220. A generative adversarial network, or GAN, can include a generator neural network and a discriminator neural network. The generator can generate elements, where the elements can include values, vectors, facial elements, facial images, and so on. The accuracy of the generator can be determined using the discriminator 222. The discriminator analyzes the elements generated by the generator. Since the discriminator is unaware of whether the element it analyzes is a real element or a synthetic element, the discriminator attempts to predict whether the element is real or synthetic (fake). In embodiments, the generator accuracy can be a criterion for the generating additional synthetic vectors. That is, an inability of the generator to generate synthetic elements that can "fool" the discriminator into predicting that the synthetic element is real can indicate that the quality of the synthetic elements is poor. The elements generated by the generator can be unsuitable for additional training of the GAN. In the flow 200, the generator accuracy can enable a classifier 224. The classifier can be used by a neural network. The neural network can comprise a convolutional neural network (CNN) to analyze facial images for facial elements. In embodiments, the classifier comprises a multi-layer perceptron. As the name implies, a multi-layer perception includes two or more layers of perceptrons. A perceptron can include an algorithm, function, procedure, and the like, for supervised training of a binary classifier. A binary classifier can be used to determine whether an element is a member of a class or not.

The flow 200 further includes back-propagating an error function into the discriminator 230. The error function is used to evaluate the efficacy of the discriminator to predict whether an element presented to it is a real element or a synthetic element. The error function can be based on a hit rate, a threshold, a value, etc. In embodiments, the error function can be determined on a real/fake 232 basis. An error occurs when the discriminator predicts that an element is real when the element is actually fake. The back-propagation can be used to enable the discriminator to make better predictions about the status of the element being real or fake. Note that back-propagating the error function to the discriminator to improve discriminator prediction accuracy runs counter to improving generator accuracy. Generator accuracy improves when synthetic elements are better able to fool the discriminator. Thus, there is an adversarial relationship between the generator and the discriminator.

Figure 3A:
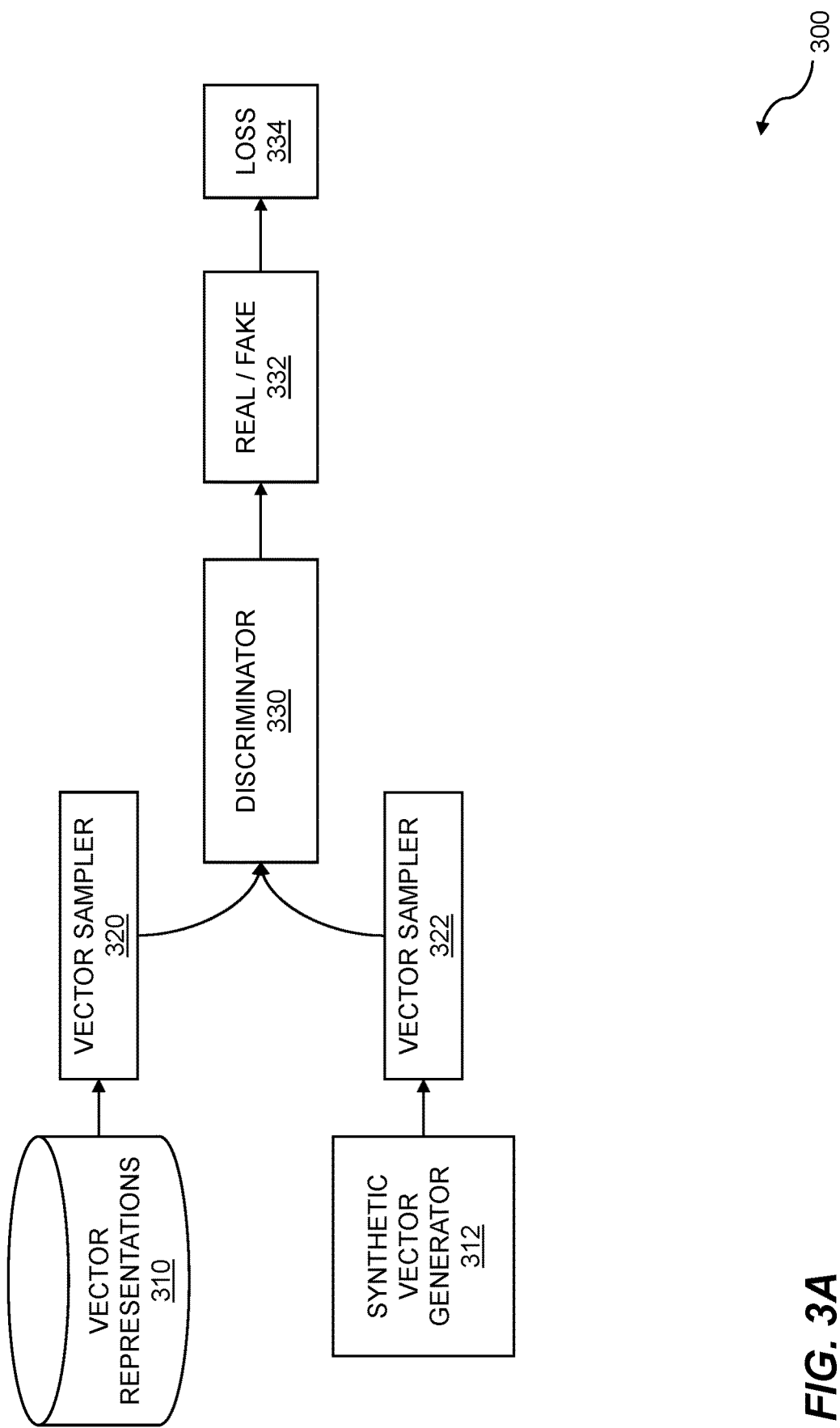
FIG. 3A is a block diagram for a generative adversarial network (GAN).

FIG. 3A is a block diagram for a generative adversarial network (GAN). A generative adversarial network can be based on two neural networks which can compete with one another as part of a machine learning technique. The two neural networks can include a generator network and a discriminator network. The GAN can be presented with a training dataset. The GAN learns from the training dataset in order to generate new data or "synthetic data" candidates based on the training dataset. The synthetic data candidates include similar characteristics found within the training dataset. In a usage example, a training dataset includes facial element data such as facial expressions, intensities of expressions, positions of facial elements, etc., in images which can be used to train the GAN to generate synthetic data. The synthetic data includes synthetic vectors. The discriminator evaluates the candidates produced by the generator to determine whether the candidates are "true" or "false" representations of the training dataset. The discriminator is trained using the training dataset, while the generator is trained based on its ability to "fool" the discriminator into determining that a synthesized candidate or vector is actually real. That is, the generator is trained by increasing the error rate of the discriminator to detect synthetic data. The GAN enables synthetic data for neural network training using vectors. Facial images for a neural network training dataset are obtained. Facial elements from the facial images are encoded into one or more vector representations of the facial elements. A generative adversarial network (GAN) generator is trained to provide synthetic vectors based on the one or more vector representations, where the synthetic vectors enable avoidance of discriminator detection in the GAN. Additional synthetic vectors are generated in the GAN, where the additional synthetic vectors avoid discriminator detection. A machine learning neural network is trained using the additional synthetic vectors.

The block diagram 300 includes vector representations 310. The vector representations can include vector representations based on data including "real world" images such as videos, video clips, still images, and so on. The vector representations can be based on facial data, torso data, physiological data, etc. The vector representations can be based on sparse facial expressions within the training dataset. In embodiments, the sparse facial expressions can include a drowsiness state. Recall that a GAN can include two neural networks. The block diagram 300 includes a synthetic vector generator 312. The synthetic vector generator can be based on a neural network such as a machine learning neural network which can be trained based on fooling a discriminator (discussed below). The block diagram includes vector samplers such as vector sampler 320 and vector sampler 322. Vector sampler 320 can select a vector representation from among the vector representations 310, and the vector sampler 322 can select a synthetic vector generated by the synthetic vector generator. The block diagram 300 includes a discriminator 330. The discriminator can be trained using a training dataset such as a facial image training dataset. The discriminator is trained by first processing vector representations from among the vector representations 310. The discriminator will reach a threshold or value that indicates it can reasonably identify the vector representations within the training dataset. At this point, the discriminator can be used to compare the vector representation sampled from the vector representations with the synthetic vector sampled from the synthetic vector generator. The discriminator attempts to determine whether the selected vector representation is the real vector or the selected synthetic vector is the real vector. A real/fake determination can be made 332. The number of incorrect determinations can be calculated as errors or losses 334.

Figure 3B:
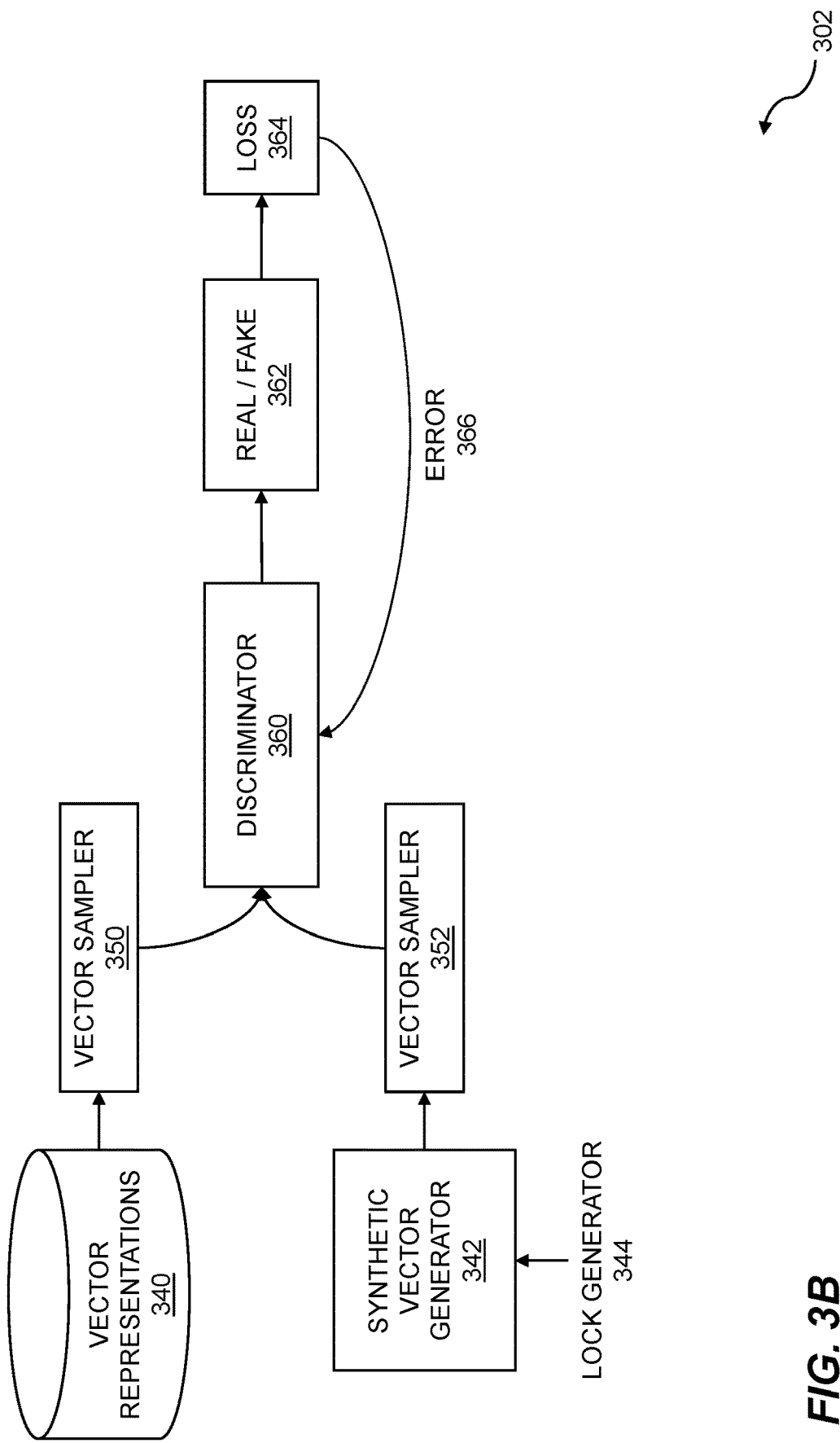
FIG. 3B shows updating discriminator weights.

FIG. 3B shows updating discriminator weights. The discriminator is based on a neural network associated with a GAN. The discriminator can be trained by applying a training dataset, such as a facial images training dataset, to the discriminator. The facial images can be encoded as facial elements and can be represented using vector representations. The contents of the training dataset include known images, such as facial images, and expected results. The training the discriminator includes determining whether an element such as a vector element encoded from facial images is a real element or a fake element. Weights associated with the discriminator neural network can be adjusted to improve accuracy of the discrimination. Updating the discriminator weights enables synthetic data for neural network training using vectors. The block diagram for updating discriminator weights 302 includes vector representations 340. The vector representations can include vectors encoded from facial images within a training dataset. The facial images can include facial elements such as a facial expressions and intensities within the training dataset. The block diagram 302 can include a synthetic vector generator 342, which, for the purposes of updating discriminator weights, can be disabled or locked 344. The block diagram 302 includes a vector sampler 350 which can select a vector from the plurality of vector representations within the training dataset. The vector sampler 352 is disabled while the synthetic vector generator is locked 344. The block diagram 302 includes a discriminator 360. The discriminator, which comprises a neural network, examines the vector presented from the vector selector 350 to determine whether the vector includes a parameter of interest within the image. The parameter of interest can include a facial element. The facial element can include a facial expression such as a smile, frown, smirk, yawn, neutral expression, etc., and an intensity associated with the facial expression. The facial element can include an eyebrow furrow. The discriminator makes a determination or prediction of "real" or "fake" 362 with respect to the test vector. An error or loss 364 can be calculated based on an accuracy achieved by the discriminator. Discriminator accuracy is determined based on the discriminator accurately predicting whether the vector is real. The loss is determined based on whether the determination or prediction by the discriminator is correct (no error) or incorrect (error). An error 366 is fed back to the discriminator 360. The fed back error can be used to adjust weights associated with nodes and layers within the neural network. The weights can be adjusted to minimize error or loss.

Figure 3C:
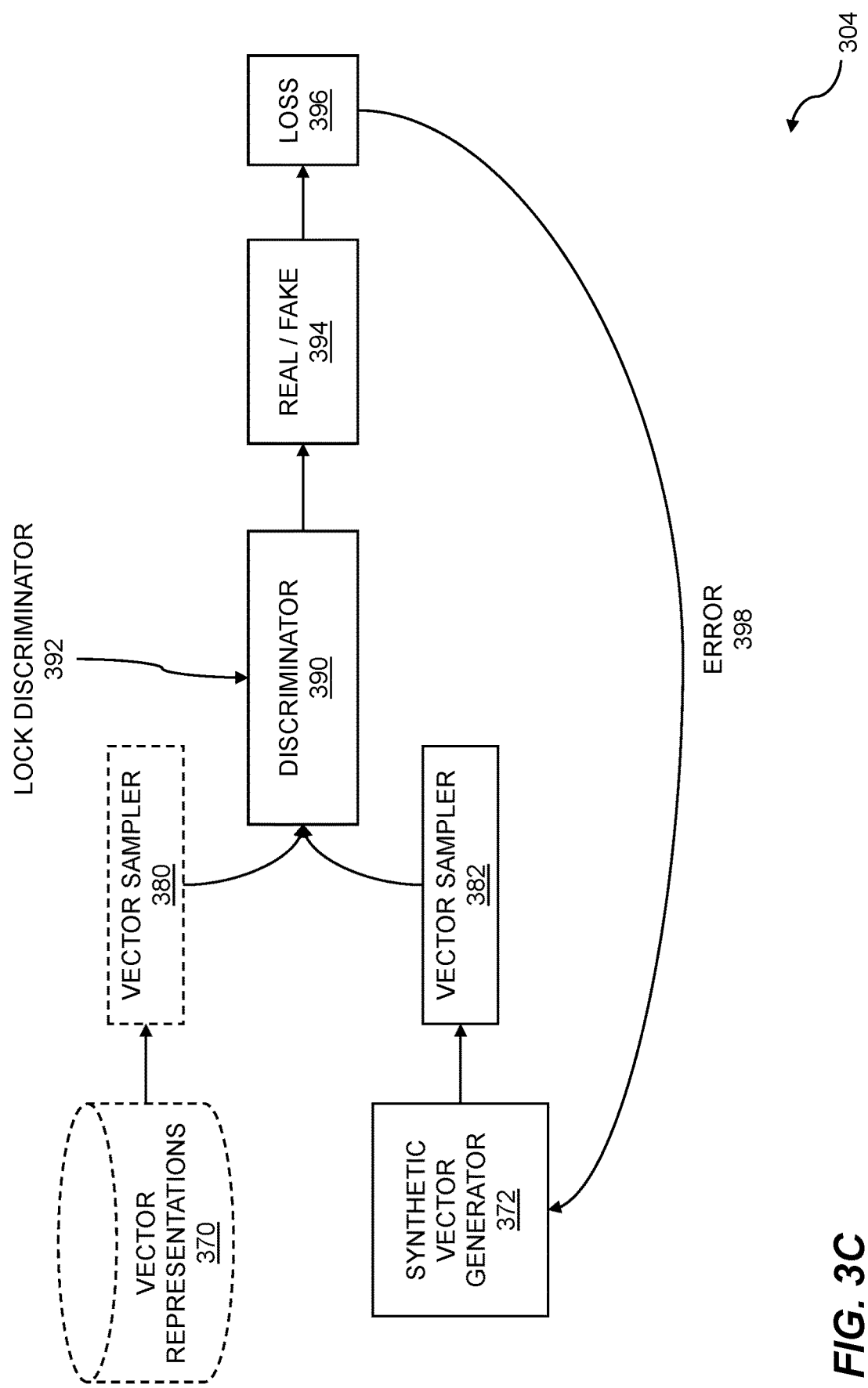
FIG. 3C shows updating generator weights.

FIG. 3C shows updating generator weights. Similar to the discriminator discussed above, the generator is based on a neural network associated with a GAN. The generator can be trained by evaluating synthetic data such as vectors generated by the synthetic vector generator. The synthetic vectors can be based on facial elements. The training of the generator is based on adjusting weights within the generator such that the synthetic vector generator is able to generate synthetic vectors indistinguishable from real vectors. Updating the generator weights enables synthetic data for neural network training using vectors. The block diagram 304 for updating generator weights can include vector representations 370. The vector representation, which can be encoded from facial images within a training dataset such as a facial element training dataset, is ignored while updating the generator weights. The block diagram 304 can include a synthetic vector generator 372. The synthetic vector generator, based on a machine learning neural network, can be trained to fool a discriminator (discussed shortly). The training includes adjusting weights associated with nodes and layers within the generator neural network. The block diagram 304 includes a vector sampler 380 which is disabled while the discriminator is locked 392. The block diagram 304 further includes a vector sampler 382 which can select a vector from among the plurality of synthetic vectors that are generated. The block diagram 304 includes a discriminator 390, which, for the purposes of adjusting synthetic vector generator weights, is locked 392. The weights associated with the discriminator remain unchanged while the discriminator is locked. The neural network associated with the discriminator examines the synthetic vector presented from the vector sampler 382 to determine whether the vector is real or synthetic. The determination of whether the synthetic vector is real can be based on a parameter or classifier pertaining to a facial element. The discriminator makes a determination or prediction of "real" or "fake" 394 with respect to the synthetic vector. An error or loss 396 can be calculated based on an accuracy achieved by the discriminator. Discriminator accuracy is determined based on the discriminator incorrectly or inaccurately predicting whether the synthetic vector is real. For this discussion, a synthetic vector is not real. The loss is determined based on whether the determination or prediction by the discriminator is correct (no error or vector is synthetic) or incorrect (error). That is, the discriminator correctly predicts that the vector is synthetic (no error). An error 398 is fed back to the synthetic vector generator 372. The fed back error can be used to adjust weights associated with nodes and layers within the neural network that comprises the synthetic vector generator. The weights can be adjusted to maximize error or loss. That is, the generator generates synthetic vectors that successfully fool the discriminator into determining that the vectors are real. Each incorrect determination is an error, thus maximizing error by the discriminator improves the "quality" of the synthetic vectors to fool the discriminator.

Discussed above, a loss function can be used to measure or quantize the ability of the generator neural network, such as a synthetic image generator, to generate synthetic data that can fool the discriminator neural network. Fooling the discriminator is based on generating synthetic data such as a synthetic image that the discriminator infers to be a real image. The synthetic data can be generated to address an imbalance or "sparsity" within a training data set that includes facial expressions. The facial expressions can include facial expressions associated with human drowsiness. The generating the synthetic data can provide or "fill in" otherwise sparse training data such that a classifier trained using the training data can be better balanced. That is, the classifier is better trained to identify facial expressions such as those facial expressions associated with human drowsiness. A loss function, such as the loss function 334 (FIG. 3A), loss function 364 (FIG. 3B), or loss function 396 (FIG. 3C) can be calculated using a variety of techniques. In embodiments, the loss function can be based on a joint optimization loss.

In a usage example, a training dataset can be based on images that include facial expressions. The facial expressions can be associated with a variety of cognitive states, mental states, human perception states, etc. In embodiments, the cognitive states can include alert, slightly drowsy, moderately drowsy, extremely drowsy, and so on. The example training dataset can be imbalanced, where the training dataset can include sufficient examples that include alert samples, while slightly drowsy samples and moderately/extremely drowsy samples can be sparse or insufficient. Discussed throughout, training, using the example dataset, can result in a biased classifier model. In order to provide a training dataset that better typifies the range of intensities of drowsy facial expressions, a configuration of a GAN can be based on an augmentation model. The GAN to be trained is typically composed of two networks such as neural networks. The first network includes the generator network. The generator G can include an upsampling generator model G, where the upsampling generator synthesizes artificial or synthetic samples of a particular domain. The domain can include facial expressions for human drowsiness. The upsampling generator can generate its synthetic data from a noise vector, where the noise vector can provide a "random" number or seed. The second network within the GAN can include a discriminator network. The discriminator D can include a downsampling model. The downsampling discriminator can learn to detect the synthetic samples from the generator.

The generator and discriminator networks of the GAN can be trained using an objective function. An example objective function for training the generator and discriminator networks can be represented as:

$$L_D = -\sum_{i=0}^{N} \log(D(x_i)) - \sum_{i=0}^{N} \log(1 - D(G(z_i)))$$

$$L_G = -\sum_{i=0}^{N} \log(D(G(z_i)))$$

where $L_D$ and $L_G$ are the loss functions for training D and G respectively, N is the batch size, z is the noise vector, and x is a real sample from collected facial images (the target object class). Although the generator network and discriminator network can be trained jointly, the trained generator network can be used by itself for generation of synthetic data post-training. Discussed throughout, in embodiments, the configuration of the GAN is formulated to generate synthetic features describing a drowsy state. The drowsy state can include a drowsy state of an operator of a vehicle.

In embodiments, a framework for the GAN can include a generator (G) neural network and a discriminator (D) neural network. The neural networks that comprise the generator and the discriminator include convolution, fully connected and activation layers. In embodiments, the generator network takes as input a 100-dimensional noise vector, sampled from a Gaussian distribution. The noise vector can be processed using three consecutive 2D convolutional layers with leaky ReLU activation. The output of the third convolutional layer can be flattened and can be provided to three fully connected layers to produce a final output from the generator. In embodiments, the output of the generator can be a synthetic vector, such as an 1800-dimensional synthetic feature vector. The discriminator takes as input such a vector such as an 1800-dimensional vector. The input vector to the discriminator can be a synthetic vector or can be real. The input vector is reshaped by the discriminator before passing the reshaped vector through a set of three 2D convolutions. The set of 2D convolutions can be followed by two fully connected dense layers. The output of the second dense layer can be processed by a final dense layer, where the final dense layer can include a single unit and activation, where the activation can include sigmoid activation. The result of the processing and the sigmoid activation can include a final prediction, where the final prediction can include a prediction about human drowsiness. The training of the discriminator can be accomplished using batches of training data. The training batches can be separated into real samples and synthetic samples. In embodiments, label smoothing can be applied.

The training described for the generator and discriminator neural networks can include adversarial binary cross-entropy as loss. To improve the training of the neural networks, techniques including correlation and joint optimization loss components can be used to add more variety and naturalness to the synthetic samples. Correlation loss can be used to generate more variations in the synthetic vectors, while preserving their "realness". A correlation loss, $L_{corr}$, can be added to the generator loss, $L_G$. Subsequent to an iteration of generator training, a vector such as an 1800-dimensional vector $x_r$ can be computed. The vector $x_r$ can be computed by averaging m randomly sampled vectors such as real image vectors:

$$x_r = \frac{1}{m}\sum_{k=1}^{m} x_i$$

N synthetic vectors $x_s$ can be generated using the generator neural network. The N synthetic vectors can be used to calculate a correlation such as a Pearson correlation between $x_r$ and each of the N synthetic vectors. In embodiments, the correlation values are nearly equal to 1. The loss $L_{corr}$ can be calculated using $$L_{corr} = 1 - \frac{1}{N}\sum_{k=1}^{N} \frac{Cov((x_s), (x_r)i)}{\sigma(x_s)i\ \sigma(x_r)i}$$

where $C_{ov}$ can include covariance between two vectors and $\sigma$ indicates standard deviation.

A classifier network can be trained along with the GAN. The training of the classifier can be based on using real vectors and synthetic vectors within real vector training datasets and synthetic vector training datasets. In contrast to the GAN which seeks to reconstruct input data for training, the classifier network seeks to predict a level of human drowsiness from real feature vectors. Following each iteration of GAN training, a set of synthetic vectors can be generated. The generating the synthetic vectors can be accomplished by providing different noise values or seeds to the generator. These generated synthetic vectors can be added to an original drowsiness dataset to augment the target sparse class and to balance distribution of the training. In embodiments, the classifier network can be trained for three epochs with the augmented data. The classifier network can be tested by processing a held-out validation dataset. The testing can be based on using a multi-category cross entropy loss:

$$L_{opt} = -\sum_{k=1}^{N} \sum_{j=1}^{N} (y_i)_j \log((p_i)_j)$$

where N is the batch size for training the classifier, and y and p are the target and predicted labels, respectively. In embodiments, the full loss of the GAN can be calculated as the weighted sum of the different losses:

$$L = L_G + \lambda_1 L_{corr} + \lambda_2 L_{opt}$$

Figure 4:
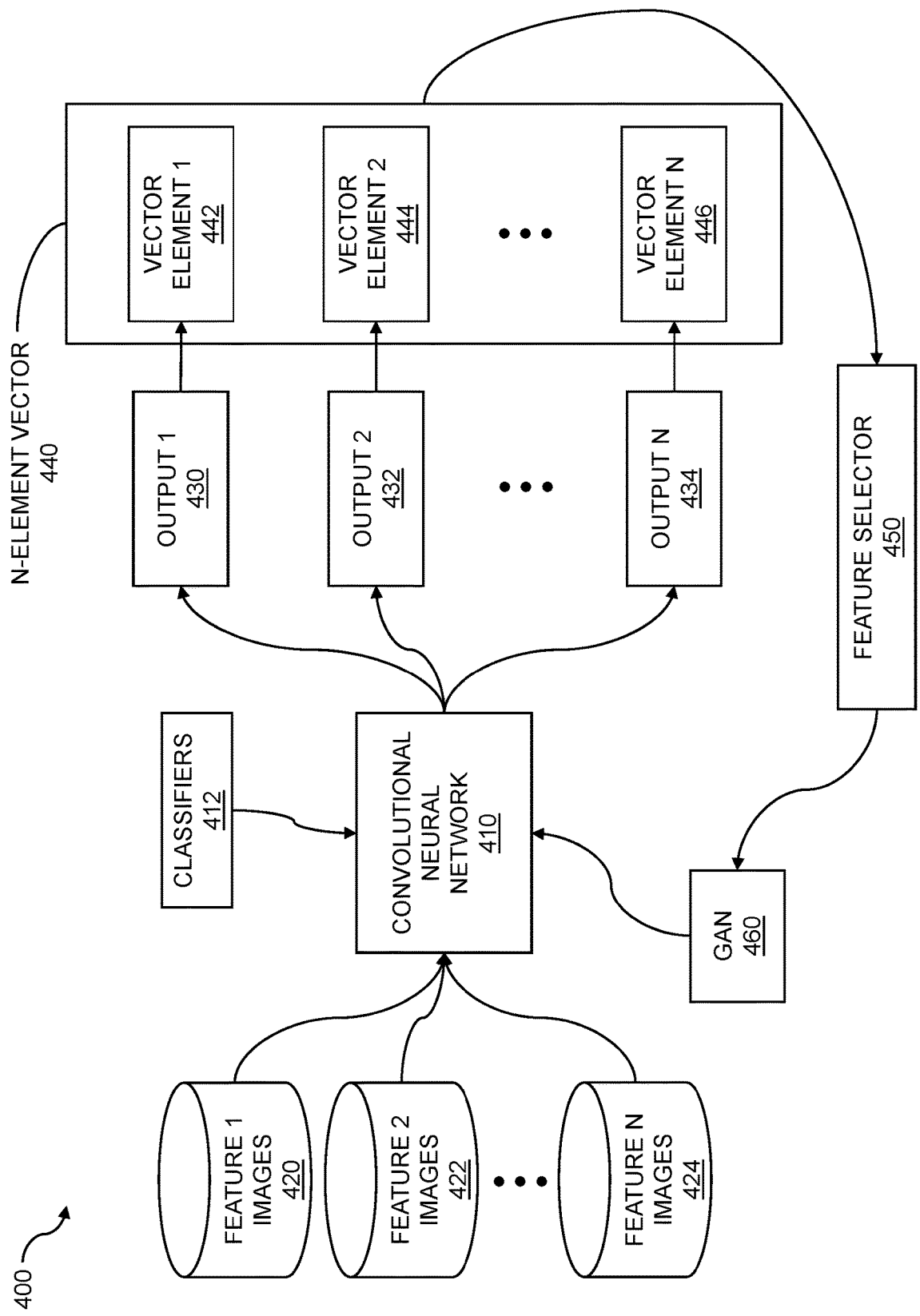
FIG. 4 is a block diagram for distilling n-element vectors.

FIG. 4 is a block diagram for distilling n-element vectors. Facial elements can be encoded from facial images, where the encoding can produce one or more values. The facial elements can include an expression, an intensity of an expression, a position of a facial element such as an eyebrow, and so on. The encoded values can be formed or distilled into a vector. In a usage example, the encoded values can include values associated with various intensities of a facial element such as a smile. The intensities can include a strong smile, a moderate smile, a weak smile, and so on. In addition to distilling vectors based on facial elements from facial images, synthetic vectors can be generated to supplement training data. The distilling n-element vectors enables synthetic data for neural network training using vectors. Facial images are obtained for a neural network training dataset. Facial elements are encoded from the facial images into one or more vector representations of the facial elements. A generative adversarial network (GAN) generator is trained to provide one or more synthetic vectors based on the one or more vector representations, where the one or more synthetic vectors enable avoidance of discriminator detection in the GAN. Additional synthetic vectors are generated in the GAN, where the additional synthetic vectors avoid discriminator detection. A machine learning neural network is trained using the additional synthetic vectors The block diagram 400 includes a convolutional neural network (CNN) 410. A CNN can be particularly useful to processing of images because it can share weights between layers within the neural network and can be translation invariant. The CNN can apply classifiers 412, where the classifiers can be used to detect one or more facial elements within facial images. Facial elements can include facial expressions, positions of facial elements such as eyebrows, and so on. The classifiers can be associated with an intensity of a facial element, such as a strong smile, a moderate or medium smile, a weak smile, and so on. The classifiers can be associated with intensities of eyebrow furrows. The CNN can apply the one or more classifiers to collections of images which contain a facial feature. In the block diagram, the images can include feature 1 images 420, feature 2 images 422, feature N images 424, and so on. The feature images can include a facial element associated with an intensity such as images containing strong smiles. In embodiments, the facial elements comprise human drowsiness features. The CNN processes the feature images using the classifiers and produces or generates output values. One or more output values can be produced for a given feature. In a usage example, a value can be generated for a strong smile, a moderate smile, and a weak smile; a value can be generated a strong, moderate, or weak eyebrow furrow; and the like. The output values can include output 1 430 associated with feature 1 images; output 2 432 associated with feature 2 images; output N 434 associated with feature N images; etc.

An n-element vector 440 can be constructed from the output values or elements. The vector can be based on facial elements, facial features, and so on. In embodiments, the human drowsiness features can be distilled into n-element vectors. The size of the n-element vector can be based on a number of elements associated with each facial element such as the smile. In embodiments, the human drowsiness features are distilled into n-element vectors. The size can be further based on a number of statistics associated with a given facial element. In embodiments, n can be equal to a number of facial element features times a number of statistics for each feature. The size of n can be chosen based on convenience, computational complexity, and so on. In embodiments, the number of facial element features is 18, the number of statistics is 6, and n is equal to 108. The n-element vector 440 can include vector element 1 442, vector element 2 444, vector element N 446, and so on.

The weights of the CNN can be updated or trained in order to improve accuracy of inferences made by the CNN. The training of the CNN can include training for a given facial element or feature such as the smile, the eyebrow furrow, and so on. The block diagram 400 includes a feature selector 450. The feature selector can be used to select which of the plurality of values associated with the plurality of facial features encoded in the n-element vector can be used for training a component such as a GAN 460. The training the GAN can be used to generate one or more synthetic vectors which can be used to further train the CNN. The further training of the CNN can improve detection of one or more facial elements or features. In embodiments, the training a GAN and generating additional synthetic vectors enable a drowsiness detection neural network. The additional synthetic vectors can be used for further training of the CNN. The synthetic vectors that can be generated by the GAN can be used for other training datasets. Further embodiments include converting the additional synthetic vectors into image data. The image data, which can include synthetic feature image data, can be applied to the CNN.

Figure 5:
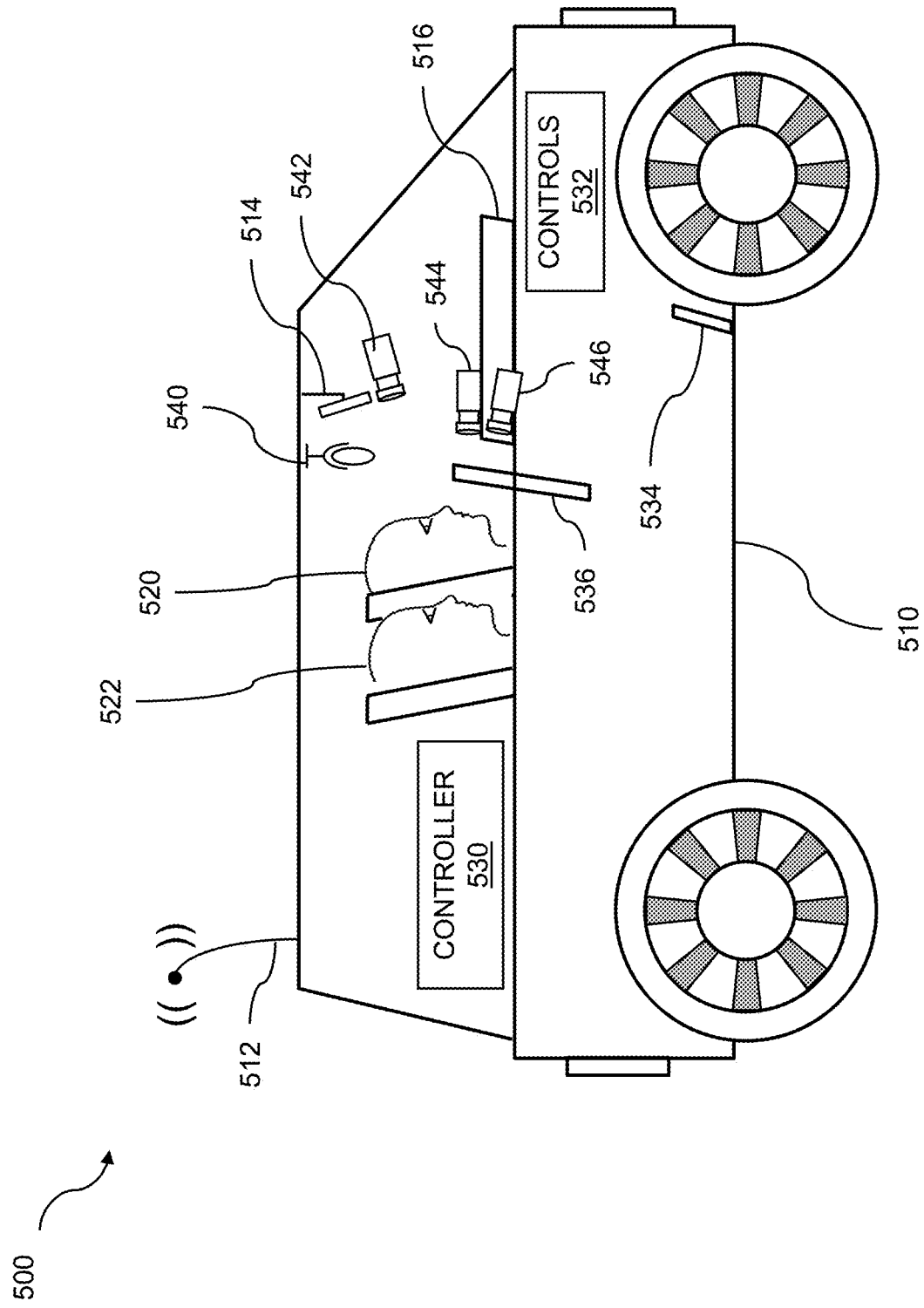
FIG. 5 is a system diagram for an interior of a vehicle.

FIG. 5 is a system diagram for an interior of a vehicle 500. Vehicle manipulation can be accomplished based on training a machine learning system. The machine learning system can include a neural network, where the neural network can be trained using one or more training data sets. The datasets for a person in a vehicle can be obtained. The collected datasets can include video data, facial data such as facial element data, audio data, voice data, physiological data, and so on. Collected data and other data can be augmented with synthetic data for neural network training using vectors. Facial images are obtained for a neural network training dataset. Facial elements from the facial images are encoded into one or more vector representations of the facial elements. A generative adversarial network (GAN) generator is trained to provide one or more synthetic vectors based on the one or more vector representations. The synthetic vectors enable avoidance of discriminator detection in the GAN.

Additional synthetic vectors are generated in the GAN, where the additional synthetic vectors avoid discriminator detection. A machine learning neural network is trained using the additional synthetic vectors. One or more occupants of a vehicle 510, such as occupants 520 and 522, can be observed using a microphone 540, one or more cameras 542, 544, or 546, and other audio and image capture techniques. The image data can include video data. The video data and the audio data can include cognitive state data, where the cognitive state data can include facial data, voice data, physiological data, and the like. The occupant can be a driver 520 of the vehicle 510, a passenger 522 within the vehicle, and so on.

The cameras or imaging devices that can be used to obtain images including facial data from the occupants of the vehicle 510 can be positioned to capture the face of the vehicle operator, the face of a vehicle passenger, multiple views of the faces of occupants of the vehicle, and so on. The cameras can be located near a rear-view mirror 514 such as camera 542, positioned near or on a dashboard 516 such as camera 544, positioned within the dashboard such as camera 546, and so on. The microphone 540, or audio capture device, can be positioned within the vehicle such that voice data, speech data, non-speech vocalizations, and so on, can be easily collected with minimal background noise. In embodiments, additional cameras, imaging devices, microphones, audio capture devices, and so on, can be located throughout the vehicle. In further embodiments, each occupant of the vehicle could have multiple cameras, microphones, etc., positioned to capture video data and audio data from that occupant.

The interior of a vehicle 510 can be a standard vehicle, an autonomous vehicle, a semi-autonomous vehicle, and so on. The vehicle can be a sedan or other automobile, a van, a sport utility vehicle (SUV), a truck, a bus, a special purpose vehicle, and the like. The interior of the vehicle 510 can include standard controls such as a steering wheel 536, a throttle control (not shown), a brake 534, and so on. The interior of the vehicle can include other controls 532 such as controls for seats, mirrors, climate settings, audio systems, etc. The controls 532 of the vehicle 510 can be controlled by a controller 530. The controller 530 can control the vehicle 510 in various manners such as autonomously, semi-autonomously, assertively to a vehicle occupant 520 or 522, etc. In embodiments, the controller provides vehicle control or manipulation techniques, assistance, etc. The controller 530 can receive instructions via an antenna 512 or using other wireless techniques. The controller 530 can be preprogrammed to cause the vehicle to follow a specific route. The specific route that the vehicle is programmed to follow can be based on the cognitive state of the vehicle occupant. The specific route can be chosen based on lowest stress, least traffic, most scenic view, shortest route, and so on.

Figure 6:
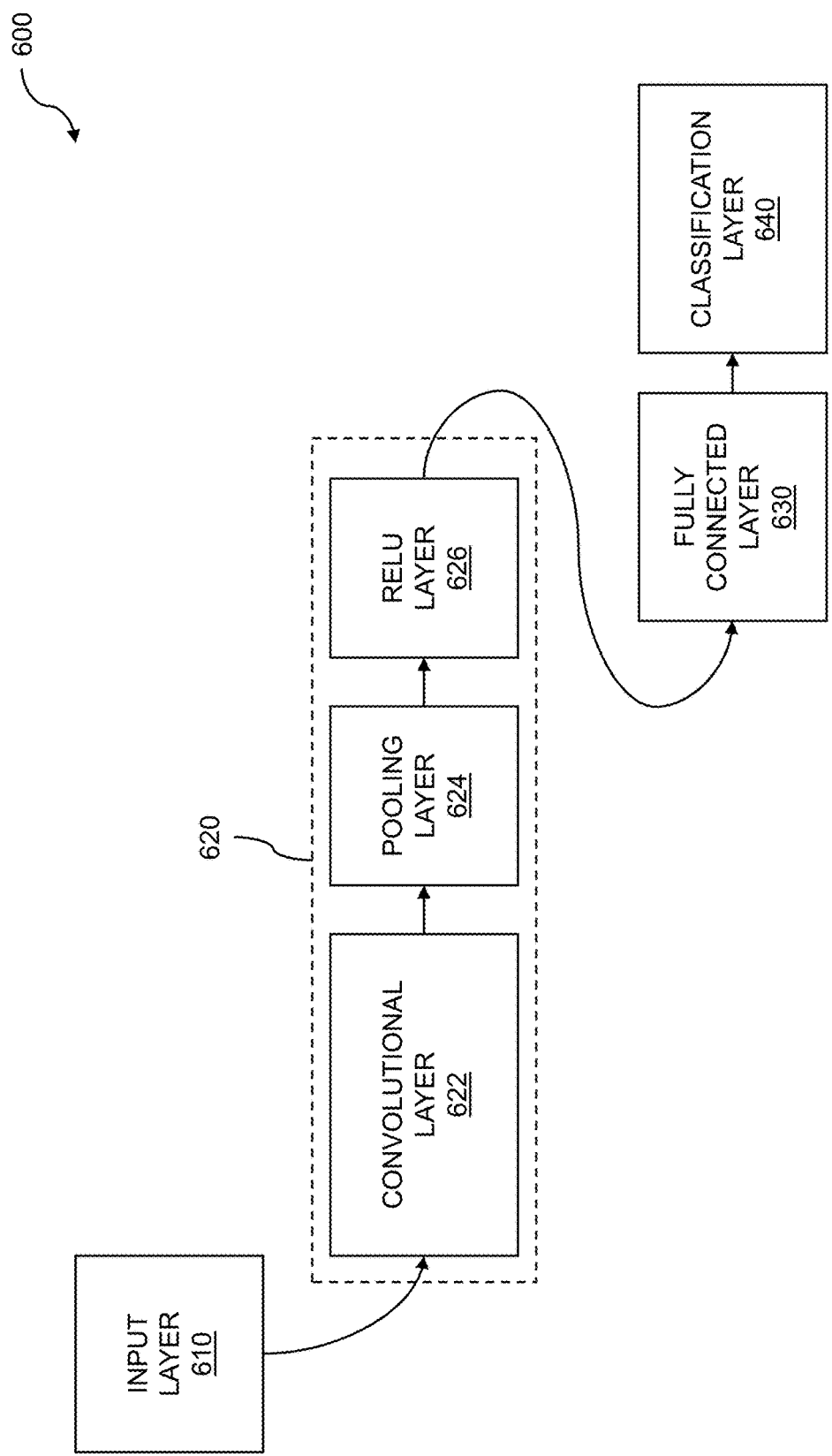
FIG. 6 is an example illustrating a convolutional neural network (CNN).

FIG. 6 is an example showing a convolutional neural network (CNN). A convolutional neural network, such as network 600, can be used for various applications. The applications for which the CNN can be used can include deep learning, where the deep learning can be applied a variety of analysis tasks such as facial element analysis. The convolutional neural network can be trained by applying a training dataset, such as a facial element training dataset, to the CNN. The training dataset can be augmented with synthetic data including synthetic vectors. Facial images for a neural network training dataset are obtained, and facial elements from the facial images are encoded into one or more vector representations of the facial elements. A generative adversarial network (GAN) generator is trained to provide one or more synthetic vectors based on the one or more vector representations, where the one or more synthetic vectors enable avoidance of discriminator detection in the GAN. Additional synthetic vectors are generated in the GAN, where the additional synthetic vectors avoid discriminator detection. A machine learning neural network is trained using the additional synthetic vectors. The convolutional neural network can be applied to analysis tasks such as image analysis, cognitive state analysis, mental state analysis, mood analysis, emotional state analysis, and so on. The CNN can be applied to various tasks such as autonomous vehicle or semiautonomous vehicle manipulation, vehicle content recommendation, and the like. When the imaging and other data collected includes cognitive state data, the cognitive state data can include mental processes, where the mental processes can include attention, creativity, memory, perception, problem solving, thinking, use of language, or the like.

Analysis, including cognitive analysis, facial expression analysis, and so on, is a very complex task. Understanding and evaluating moods, emotions, mental states, or cognitive states, requires a nuanced evaluation of facial expressions or other cues generated by people. Emotional state, mental state, cognitive state, and so on, are terms of art which may connote slight differences of emphasis, for example an emotional state of "happiness" vs. a cognitive state of "distractedness," but at a high level, the terms can be used interchangeably. In fact, because the human mind of an individual is often difficult to understand, even for the individual, emotional, mental, and cognitive states may easily be overlapping and appropriately used in a general sense. Cognitive state analysis is important in many areas such as research, psychology, business, intelligence, law enforcement, and so on. The understanding of cognitive states can be useful for a variety of business purposes, such as improving marketing analysis, assessing the effectiveness of customer service interactions and retail experiences, and evaluating the consumption of content such as movies and videos. Identifying points of frustration in a customer transaction can allow a company to address the causes of the frustration. By streamlining processes, key performance areas such as customer satisfaction and customer transaction throughput can be improved, resulting in increased sales and revenues. In a content scenario, producing compelling content that achieves the desired effect (e.g., fear, shock, laughter, etc.) can result in increased ticket sales and/or increased advertising revenue. If a movie studio is producing a horror movie, it is desirable to know if the scary scenes in the movie are achieving the desired effect. By conducting tests in sample audiences, and analyzing faces in the audience, a computer-implemented method and system can process thousands of faces to assess the cognitive state at the time of the scary scenes. In many ways, such an analysis can be more effective than surveys that ask audience members questions, since audience members may consciously or subconsciously change answers based on peer pressure or other factors. However, spontaneous facial expressions can be more difficult to conceal. Thus, by analyzing facial expressions en masse in real time, important information regarding the general cognitive state of the audience can be obtained.

Analysis of facial expressions is also a complex task. Image data, where the image data can include facial data, can be analyzed to identify a range of facial expressions. The facial expressions can include a smile, frown, smirk, and so on. The image data and facial data can be processed to identify the facial expressions. The processing can include analysis of expression data, action units, gestures, mental states, cognitive states, physiological data, and so on. Facial data as contained in the raw video data can include information on one or more of action units, head gestures, smiles, brow furrows, squints, lowered eyebrows, raised eyebrows, attention, and the like. The action units can be used to identify smiles, frowns, and other facial indicators of expressions. Gestures can also be identified, and can include a head tilt to the side, a forward lean, a smile, a frown, as well as many other gestures. Other types of data including physiological data can be collected, where the physiological data can be obtained using a camera or other image capture device, without contacting the person or persons. Respiration, heart rate, heart rate variability, perspiration, temperature, and other physiological indicators of cognitive state can be determined by analyzing the images and video data.

Deep learning is a branch of machine learning which seeks to imitate in software the activity which takes place in layers of neurons in the neocortex of the human brain. This imitative activity can enable software to "learn" to recognize and identify patterns in data, where the data can include digital forms of images, sounds, and so on. The deep learning software is used to simulate the large array of neurons of the neocortex. This simulated neocortex, or artificial neural network, can be implemented using mathematical formulas that are evaluated on processors. With the ever-increasing capabilities of the processors, increasing numbers of layers of the artificial neural network can be processed.

Deep learning applications include processing of image data, audio data, and so on. Image data applications include image recognition, facial recognition, etc. Image data applications can include differentiating dogs from cats, identifying different human faces, and the like. The image data applications can include identifying cognitive states, moods, mental states, emotional states, and so on, from the facial expressions of the faces that are identified. Audio data applications can include analyzing audio such as ambient room sounds, physiological sounds such as breathing or coughing, noises made by an individual such as tapping and drumming, voices, and so on. The voice data applications can include analyzing a voice for timbre, prosody, vocal register, vocal resonance, pitch, loudness, speech rate, or language content. The voice data analysis can be used to determine one or more cognitive states, moods, mental states, emotional states, etc.

The artificial neural network, such as a convolutional neural network which forms the basis for deep learning, is based on layers. The layers can include an input layer, a convolutional layer, a fully connected layer, a classification layer, and so on. The input layer can receive input data such as image data, where the image data can include a variety of formats including pixel formats. The input layer can then perform processing tasks such as identifying boundaries of the face, identifying landmarks of the face, extracting features of the face, and/or rotating a face within the plurality of images. The convolutional layer can represent an artificial neural network such as a convolutional neural network. A convolutional neural network can contain a plurality of hidden layers within it. A convolutional layer can reduce the amount of data feeding into a fully connected layer. The fully connected layer processes each pixel/data point from the convolutional layer. A last layer within the multiple layers can provide output indicative of cognitive state. The last layer of the convolutional neural network can be the final classification layer. The output of the final classification layer can be indicative of the cognitive states of faces within the images that are provided to the input layer.

Deep networks including deep convolutional neural networks can be used for facial expression parsing. A first layer of the deep network includes multiple nodes, where each node represents a neuron within a neural network. The first layer can receive data from an input layer. The output of the first layer can feed to a second layer, where the latter layer also includes multiple nodes. A weight can be used to adjust the output of the first layer which is being input to the second layer. Some layers in the convolutional neural network can be hidden layers. The output of the second layer can feed to a third layer. The third layer can also include multiple nodes. A weight can adjust the output of the second layer which is being input to the third layer. The third layer may be a hidden layer. Outputs of a given layer can be fed to the next layer. Weights adjust the output of one layer as it is fed to the next layer. When the final layer is reached, the output of the final layer can be a facial expression, a cognitive state, a mental state, a characteristic of a voice, and so on. The facial expression can be identified using a hidden layer from the one or more hidden layers. The weights can be provided on inputs to the multiple layers to emphasize certain facial features within the face. The convolutional neural network can be trained to identify facial expressions, voice characteristics, etc. The training can include assigning weights to inputs on one or more layers within the multilayered analysis engine. One or more of the weights can be adjusted or updated during training. The assigning weights can be accomplished during a feed-forward pass through the multilayered neural network. In a feed-forward arrangement, the information moves forward from the input nodes, through the hidden nodes, and on to the output nodes. Additionally, the weights can be updated during a backpropagation process through the multilayered analysis engine.

Returning to the figure, FIG. 6 is an example showing a convolutional neural network 600. The convolutional neural network can be used for deep learning, where the deep learning can be applied to image analysis for human perception artificial intelligence. The deep learning system can be accomplished using a variety of networks. In embodiments, the deep learning can be performed using a convolutional neural network. Other types of networks or neural networks can also be used. In other embodiments, the deep learning can be performed using a recurrent neural network. The deep learning can accomplish upper torso identification, facial recognition, analysis tasks, etc. The network includes an input layer 610. The input layer 610 receives image data. The image data can be input in a variety of formats, such as JPEG, TIFF, BMP, and GIF. Compressed image formats can be decompressed into arrays of pixels, wherein each pixel can include an RGB tuple. The input layer 610 can then perform processing such as identifying boundaries of the face, identifying landmarks of the face, extracting features of the face, and/or rotating a face within the plurality of images.

The network includes a collection of intermediate layers 620. The multilayered analysis engine can include a convolutional neural network. Thus, the intermediate layers can include a convolutional layer 622. The convolutional layer 622 can include multiple sublayers, including hidden layers within it. The output of the convolutional layer 622 feeds into a pooling layer 624. The pooling layer 624 performs a data reduction, which makes the overall computation more efficient. Thus, the pooling layer reduces the spatial size of the image representation to reduce the number of parameters and computation in the network. In some embodiments, the pooling layer is implemented using filters of size 2×2, applied with a stride of two samples for every depth slice along both width and height, resulting in a reduction of 75-percent of the downstream node activations. The multi-layered analysis engine can further include a max pooling layer 624. Thus, in embodiments, the pooling layer is a max pooling layer, in which the output of the filters is based on a maximum of the inputs. For example, with a 2×2 filter, the output is based on a maximum value from the four input values. In other embodiments, the pooling layer is an average pooling layer or L2-norm pooling layer. Various other pooling schemes are possible.

The intermediate layers can include a Rectified Linear Units (RELU) layer 626. The output of the pooling layer 624 can be input to the RELU layer 626. In embodiments, the RELU layer implements an activation function such as $f(x)-max(0,x)$, thus providing an activation with a threshold at zero. In some embodiments, the RELU layer 626 is a leaky RELU layer. In this case, instead of the activation function providing zero when x<0, a small negative slope is used, resulting in an activation function such as $f(x)=1(x<0)(\alpha x)+1(x>=0)(x)$. This can reduce the risk of "dying RELU" syndrome, where portions of the network can be "dead" with nodes/neurons that do not activate across the training dataset. The image analysis can comprise training a multilayered analysis engine using the plurality of images, wherein the multilayered analysis engine can include multiple layers that comprise one or more convolutional layers 622 and one or more hidden layers, and wherein the multilayered analysis engine can be used for emotional analysis.

The example 600 includes a fully connected layer 630. The fully connected layer 630 processes each pixel/data point from the output of the collection of intermediate layers 620. The fully connected layer 630 takes all neurons in the previous layer and connects them to every single neuron it has. The output of the fully connected layer 630 provides input to a classification layer 640. The output of the classification layer 640 provides a facial expression and/or cognitive state as its output. Thus, a multilayered analysis engine such as the one depicted in FIG. 6 processes image data using weights, models the way the human visual cortex performs object recognition and learning, and effectively analyzes image data to infer facial expressions and cognitive states.

Machine learning for generating parameters, analyzing data such as facial data and audio data, and so on, can be based on a variety of computational techniques. Generally, machine learning can be used for constructing algorithms and models. The constructed algorithms, when executed, can be used to make a range of predictions relating to data. The predictions can include whether an object in an image is a face, a box, or a puppy; whether a voice is female, male, or robotic; whether a message is legitimate email or a "spam" message; and so on. The data can include unstructured data and can be of large quantity. The algorithms that can be generated by machine learning techniques are particularly useful to data analysis because the instructions that comprise the data analysis technique do not need to be static. Instead, the machine learning algorithm or model, generated by the machine learning technique, can adapt. Adaptation of the learning algorithm can be based on a range of criteria such as success rate, failure rate, and so on. A successful algorithm is one that can adapt—or learn—as more data is presented to the algorithm. Initially, an algorithm can be "trained" by presenting it with a set of known data (supervised learning). Another approach, called unsupervised learning, can be used to identify trends and patterns within data. Unsupervised learning is not trained using known data prior to data analysis.

Reinforced learning is an approach to machine learning that is inspired by behaviorist psychology. The underlying premise of reinforced learning (also called reinforcement learning) is that software agents can take actions in an environment. The actions that are taken by the agents should maximize a goal such as a "cumulative reward". A software agent is a computer program that acts on behalf of a user or other program. The software agent is implied to have the authority to act on behalf of the user or program. The actions taken are decided by action selection to determine what to do next. In machine learning, the environment in which the agents act can be formulated as a Markov decision process (MDP). The MDPs provide a mathematical framework for modeling of decision making in environments where the outcomes can be partly random (stochastic) and partly under the control of the decision maker. Dynamic programming techniques can be used for reinforced learning algorithms. Reinforced learning is different from supervised learning in that correct input/output pairs are not presented, and sub-optimal actions are not explicitly corrected. Rather, online or computational performance is the focus. Online performance includes finding a balance between exploration of new (uncharted) territory or spaces and exploitation of current knowledge. That is, there is a tradeoff between exploration and exploitation.

Machine learning based on reinforced learning adjusts or learns based on learning an action, a combination of actions, and so on. An outcome results from taking an action. Thus, the learning model, algorithm, etc., learns from the outcomes that result from taking the action or combination of actions. The reinforced learning can include identifying positive outcomes, where the positive outcomes are used to adjust the learning models, algorithms, and so on. A positive outcome can be dependent on a context. When the outcome is based on a mood, emotional state, mental state, cognitive state, etc., of an individual, then a positive mood, emotion, mental state, or cognitive state can be used to adjust the model and the algorithm. Positive outcomes can include the person being more engaged, where engagement is based on affect, the person spending more time playing an online game or navigating a webpage, the person converting by buying a product or service, and so on. The reinforced learning can be based on exploring a solution space and adapting the model, algorithm, etc., which stem from outcomes of the exploration. When positive outcomes are encountered, the positive outcomes can be reinforced by changing weighting values within the model, algorithm, etc. Positive outcomes may result in increased weighting values. Negative outcomes can also be considered, where weighting values may be reduced or otherwise adjusted.

Figure 7:
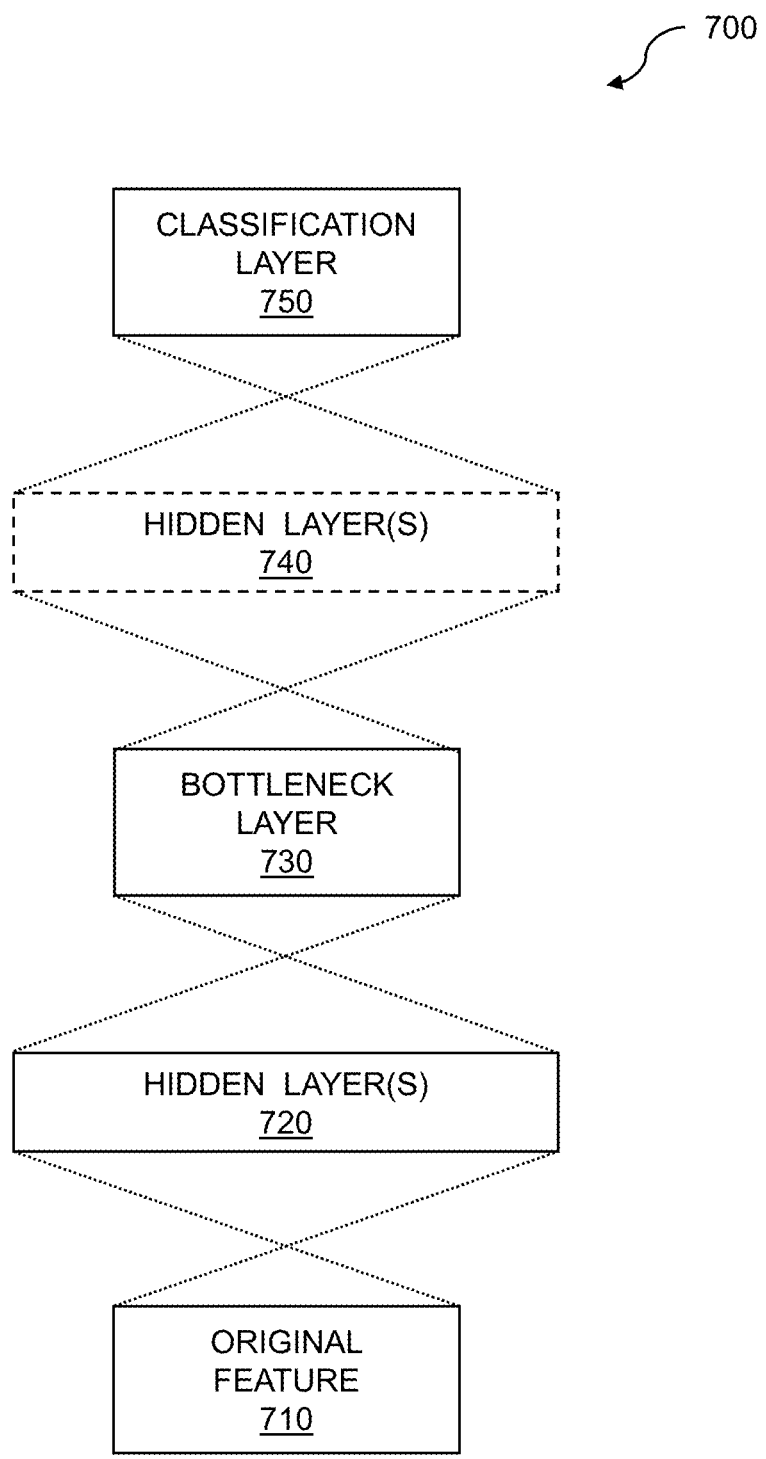
FIG. 7 shows a bottleneck layer within a deep learning environment.

FIG. 7 illustrates a bottleneck layer within a deep learning environment. The deep learning environment can include a machine learning system, where the machine learning system can be based on a neural network such as a deep neural network. The deep neural network comprises a plurality of layers such as input layers, output layers, convolutional layers, activation layers, and so on. The plurality of layers in a deep neural network (DNN) can include a bottleneck layer. The bottleneck layer can be used for neural network training, where the training can be accomplished using synthetic data based on vectors. The neural network that is trained can be applied to analysis such as image analysis of facial images for facial elements. A deep neural network can apply classifiers such as object classifiers, image classifiers, facial classifiers, facial expression classifiers, audio classifiers, speech classifiers, physiological classifiers, and so on. The classifiers can be learned by analyzing one or more of facial elements, cognitive states, cognitive load metrics, interaction metrics, etc. Facial images are obtained for a neural network training dataset. Facial elements from the facial images are encoded into one or more vector representations of the facial elements. A generative adversarial network (GAN) generator is trained to provide one or more synthetic vectors based on the one or more vector representations. The synthetic vectors enable avoidance of discriminator detection in the GAN. Additional synthetic vectors are generated in the GAN, where the additional synthetic vectors avoid discriminator detection. A machine learning neural network is trained using the additional synthetic vectors.

Layers of a deep neural network can include a bottleneck layer 700. A bottleneck layer can be used for a variety of applications such as identification of a facial portion, identification of an upper torso, facial recognition, voice recognition, emotional state recognition, and so on. The deep neural network in which the bottleneck layer is located can include a plurality of layers. The plurality of layers can include an original feature layer 710. A feature such as an image feature can include points, edges, objects, boundaries between and among regions, properties, and so on. The deep neural network can include one or more hidden layers 720. The one or more hidden layers can include nodes, where the nodes can include nonlinear activation functions and other techniques. The bottleneck layer can be a layer that learns translation vectors to transform a neutral face to an emotional or expressive face. In some embodiments, the translation vectors can transform a neutral sounding voice to an emotional or expressive voice. Specifically, activations of the bottleneck layer determine how the transformation occurs. A single bottleneck layer can be trained to transform a neutral face or voice to a different emotional face or voice. In some cases, an individual bottleneck layer can be trained for a transformation pair. At runtime, once the user's emotion has been identified and an appropriate response to it can be determined (mirrored or complementary), the trained bottleneck layer can be used to perform the needed transformation.

The deep neural network can include a bottleneck layer 730. The bottleneck layer can include a fewer number of nodes than the one or more preceding hidden layers. The bottleneck layer can create a constriction in the deep neural network or other network. The bottleneck layer can force information that is pertinent to a classification, for example, into a low dimensional representation. The bottleneck features can be extracted using an unsupervised technique. In other embodiments, the bottleneck features can be extracted using a supervised technique. The supervised technique can include training the deep neural network with a known dataset. The features can be extracted from an autoencoder such as a variational autoencoder, a generative autoencoder, and so on. The deep neural network can include hidden layers 740. The number of the hidden layers can include zero hidden layers, one hidden layer, a plurality of hidden layers, and so on. The hidden layers following the bottleneck layer can include more nodes than the bottleneck layer. The deep neural network can include a classification layer 750. The classification layer can be used to identify the points, edges, objects, boundaries, and so on, described above. The classification layer can be used to identify cognitive states, mental states, emotional states, moods, and the like. The output of the final classification layer can be indicative of the emotional states of faces within the images, where the images can be processed using the deep neural network.

Figure 8:
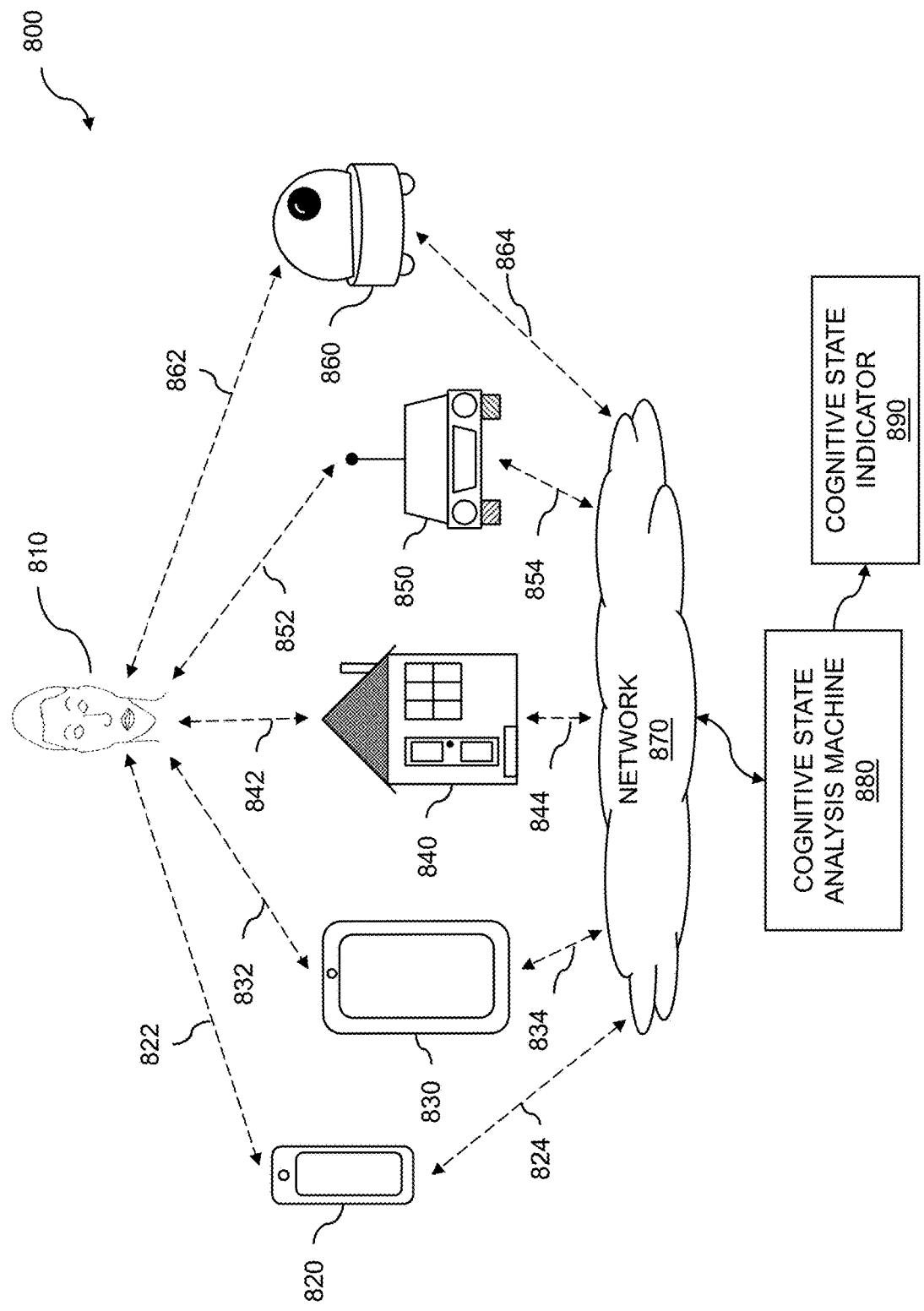
FIG. 8 illustrates data collection including devices and locations.

FIG. 8 shows data collection including devices and locations 800. Data, including facial element training data, imaging, facial or torso data, video data, audio data, and physiological data can be obtained for machine learning. The machine learning can be applied to synthetic data for neural network training using vectors. The training, imaging, audio, physiological, and other data can be obtained from multiple devices, vehicles, and locations. Facial images are obtained for a neural network training dataset. Facial elements are encoded from the facial images into one or more vector representations of the facial elements. A generative adversarial network (GAN) generator is trained to provide one or more synthetic vectors based on the one or more vector representations, where the one or more synthetic vectors enable avoidance of discriminator detection in the GAN. Additional synthetic vectors are generated in the GAN, where the additional synthetic vectors avoid discriminator detection. A machine learning neural network is trained using the additional synthetic vectors.

The multiple mobile devices, vehicles, and locations 800 can be used separately or in combination to collect imaging, video data, audio data, physio data, training data, etc., on a user 810. The imaging can include video data, where the video data can include upper torso data. Other data such as audio data, physiological data, and so on, can be collected on the user. While one person is shown, the video data, or other data, can be collected on multiple people. A user 810 can be observed as she or he is performing a task, experiencing an event, viewing a media presentation, and so on. The user 810 can be shown one or more media presentations, political presentations, social media, or another form of displayed media. The one or more media presentations can be shown to a plurality of people. The media presentations can be displayed on an electronic display coupled to a client device. The data collected on the user 810 or on a plurality of users can be in the form of one or more videos, video frames, still images, etc. The plurality of videos can be of people who are experiencing different situations. Some example situations can include the user or plurality of users being exposed to TV programs, movies, video clips, social media, social sharing, and other such media. The situations could also include exposure to media such as advertisements, political messages, news programs, and so on. As previously noted, video data can be collected on one or more users in substantially identical or different situations and viewing either a single media presentation or a plurality of presentations. The data collected on the user 810 can be analyzed and viewed for a variety of purposes including body position or body language analysis, expression analysis, mental state analysis, cognitive state analysis, and so on. The electronic display can be on a smartphone 820 as shown, a tablet computer 830, a personal digital assistant, a television, a mobile monitor, or any other type of electronic device. In one embodiment, expression data is collected on a mobile device such as a cell phone 820, a tablet computer 830, a laptop computer, or a watch. Thus, the multiple sources can include at least one mobile device, such as a phone 820 or a tablet 830, or a wearable device such as a watch or glasses (not shown). A mobile device can include a front-side camera and/or a back-side camera that can be used to collect expression data. Sources of expression data can include a webcam, a phone camera, a tablet camera, a wearable camera, and a mobile camera. A wearable camera can comprise various camera devices, such as a watch camera. In addition to using client devices for data collection from the user 810, data can be collected in a house 840 using a web camera or the like; in a vehicle 850 using a web camera, client device, etc.; by a social robot 860; and so on.

As the user 810 is monitored, the user 810 might move due to the nature of the task, boredom, discomfort, distractions, or for another reason. As the user moves, the camera with a view of the user's face can be changed. Thus, as an example, if the user 810 is looking in a first direction, the line of sight 822 from the smartphone 820 is able to observe the user's face, but if the user is looking in a second direction, the line of sight 832 from the tablet 830 is able to observe the user's face. Furthermore, in other embodiments, if the user is looking in a third direction, the line of sight 842 from a camera in the house 840 is able to observe the user's face, and if the user is looking in a fourth direction, the line of sight 852 from the camera in the vehicle 850 is able to observe the user's face. If the user is looking in a fifth direction, the line of sight 862 from the social robot 860 is able to observe the user's face. If the user is looking in a sixth direction, a line of sight from a wearable watch-type device, with a camera included on the device, is able to observe the user's face. In other embodiments, the wearable device is another device, such as an earpiece with a camera, a helmet or hat with a camera, a clip-on camera attached to clothing, or any other type of wearable device with a camera or other sensor for collecting expression data. The user 810 can also use a wearable device including a camera for gathering contextual information and/or collecting expression data on other users. Because the user 810 can move her or his head, the facial data can be collected intermittently when she or he is looking in a direction of a camera. In some cases, multiple people can be included in the view from one or more cameras, and some embodiments include filtering out faces of one or more other people to determine whether the user 810 is looking toward a camera. All or some of the expression data can be continuously or sporadically available from the various devices and other devices.

The captured video data can include cognitive content, such as facial expressions, etc., and can be transferred over a network 870. The network can include the Internet or other computer network. The smartphone 820 can share video using a link 824, the tablet 830 using a link 834, the house 840 using a link 844, the vehicle 850 using a link 854, and the social robot 860 using a link 864. The links 824, 834, 844, 854, and 864 can be wired, wireless, and hybrid links. The captured video data, including facial expressions, can be analyzed on a cognitive state analysis machine 880, on a computing device such as the video capture device, or on another separate device. The analysis could take place on one of the mobile devices discussed above, on a local server, on a remote server, and so on. In embodiments, some of the analysis takes place on the mobile device, while other analysis takes place on a server device. The analysis of the video data can include the use of a classifier. The video data can be captured using one of the mobile devices discussed above and sent to a server or another computing device for analysis. However, the captured video data including expressions can also be analyzed on the device which performed the capturing. The analysis can be performed on a mobile device where the videos were obtained with the mobile device and wherein the mobile device includes one or more of a laptop computer, a tablet, a PDA, a smartphone, a wearable device, and so on. In another embodiment, the analyzing comprises using a classifier on a server or another computing device different from the capture device. The analysis data from the cognitive state analysis engine can be processed by a cognitive state indicator 890. The cognitive state indicator 890 can indicate cognitive states, mental states, moods, emotions, etc. In embodiments, the cognitive state can include drowsiness, fatigue, distraction, impairment, sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth.

Machine learning can be based on a machine learning system which uses one or more neural networks. The neural networks are trained using a training dataset for facial expressions. The training dataset can be uploaded by a user, downloaded over a computer network from a repository or library, and so on. Sparse classes of facial expressions are identified within the training dataset. The identification can be based on a sample size threshold for a feature or class of facial expression within the training dataset. In some embodiments, the identifying can be accomplished using a neural network. In embodiments, the neural network can comprise a classifier. The training dataset can be augmented by generating synthetic data using a generative adversarial network or GAN. The generated synthetic data can augment the sparse classes of facial expressions. The training of the neural network can continue by jointly optimizing generator and discriminator components associated with the GAN. The trained neural network can be used to process further data other than the training data. In embodiments, the trained values of the neural network can be used to train a further neural network, where the further neural network can comprise a "production" neural network.

Neural network training is based on techniques such as applying "known good" data to the neural network in order to adjust one or more weights or biases, to add or remove layers, etc., within the neural network. The adjusting weights can be performed to enable applications such as machine vision, machine hearing, and so on. The adjusting weights can be performed to determine facial expressions, human perception states, cognitive states, emotional states, moods, etc. In embodiments, the facial expressions can be associated with one or more cognitive states. The various states can be associated with an individual as she or he interacts with an electronic device or a computing device, consumes media, travels in or on a vehicle, and so on. The synthetic data augmentation for neural network training is based on obtaining one or more training datasets. A training dataset can include facial expression data, facial data, image data, audio data, physiological data, and so on. The images can include video images, still images, intermittently obtained images, and so on. The images can include visible light images, near-infrared light images, etc. Weights can be trained on a set of layers for deep learning by applying a known good or "training" data set. The weights can be deployed onto nodes within the neural network. The neural network can include deep learning nodes. The training can include further training or retraining weights. The training can include annotating the training data with metadata where the metadata includes versioning information. Additional training data can be received for the neural network, and the versioning information can be modified based on the additional training data.

Training data for a neural network is obtained, where the training data is processed on a machine learning system. The training data can include facial expression data, facial data, voice data, physiological data, and so on. Various components can be used for collecting the data, such as imaging components, microphones, sensors, and so on. The imaging components can include cameras, where the cameras can include a video camera, a still camera, a camera array, a plenoptic camera, a web-enabled camera, a visible light camera, a near-infrared (NIR) camera, a heat camera, and so on. The images and/or other data are used to train the neural network. The neural network can be trained for various types of analysis including image analysis, audio analysis, physiological analysis, and the like. The analysis can be performed on the neural network, where the neural network has been trained using machine learning. A deep learning neural network comprises layers, where each layer within the neural network includes nodes. The operation of the deep learning neural network can be modified or adapted by changing the values of weights associated with the nodes within each layer of the neural network. The changing of the weights associated with the nodes and layers within the neural network comprises retraining of the neural network. The retraining can be performed to improve the efficacy of the analysis for facial expressions, cognitive states, etc. The weights that are trained are deployed onto deep learning nodes of a device, such as a user device or a computing device, and the weights can be retrained over time or as necessary. The retraining can result from using further training data.

Figure 9:
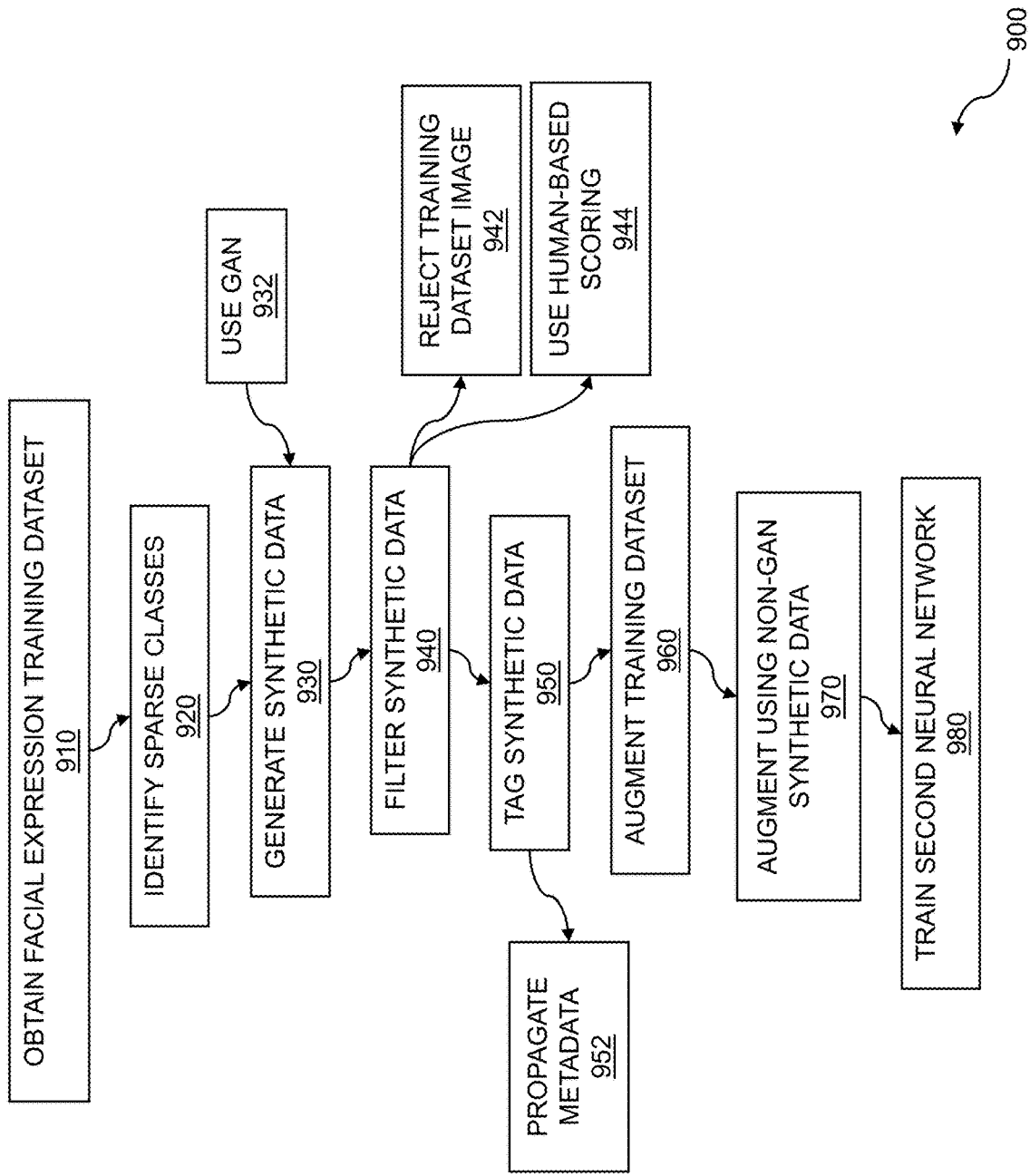
FIG. 9 is a flow diagram for synthetic data augmentation for neural network training.

FIG. 9 is a system diagram for synthetic data augmentation for neural network training. The flow diagram 900 is based on a computer-implemented method for machine learning. The flow 900 includes obtaining a facial expression training dataset 910 for a first neural network implemented on a machine learning system. The machine learning system comprises a multi-layer perceptron. The facial expression training dataset can be uploaded by a user, downloaded from a library or repository over a network, and so on. The facial expression training dataset can include one or more facial expressions, where the facial expressions can convey one or more cognitive states. The facial expressions can indicate happy, disgusted, angry, fearful, surprised, sad, and so on. The neural network that can be trained using the facial expression training dataset can include a deep learning (DL) neural network, a convolutional neural network (CNN), a recurrent neural network (RNN), and the like. In embodiments, the machine learning system comprises a convolutional neural network or a recurrent neural network. The machine learning system can be based on an integrated circuit or chip, a computer such as a laptop or desktop computer, or on a personal electronic device such as a smartphone, tablet, or personal digital assistant (PDA), etc. The semiconductor chip can include a standalone chip, a subsystem of a chip, a module of a multi-chip module (MCM), and so on. The semiconductor chip can include a programmable chip such as a programmable logic array (PLA), a programmable logic device (PLD), a field programmable gate array (FPGA), a read only memory (ROM), and so on. The semiconductor chip can include a full-custom chip design. The semiconductor chip can be reprogrammed, reconfigured, etc., "on the fly", in the field, or at any time convenient to the user of the semiconductor chip. The semiconductor chip can be implemented in any semiconductor technology. In other embodiments, a machine learning system includes a multi-layer perceptron. A perceptron can include an algorithm, based on supervised learning, that can be used for learning classifiers.

The flow 900 includes identifying one or more sparse classes 920 of facial expressions within the training dataset. A class of a facial expression can be identified using a function, algorithm, heuristic, and so on, that can detect a facial expression. A sparse class of a facial expression can differ from a more abundant class of a facial expression in that the sparse class is uncommon or difficult to identify in potential training image data. For example, while an alert person image can be relatively easy to obtain and/or identify, a drowsy person image can be much more difficult to obtain and/or identify. The flow 900 includes generating synthetic data 930 to augment the sparse classes. The synthetic data that is generated can include facial expressions, identified facial expression classes, identified sparse classes, and so on. In the flow 900, the generating synthetic data uses at least one generative adversarial network (GAN) 932. A GAN can be based on two or more neural networks, where the neural networks compete against each other to determine a better or best solution. In embodiments, the GAN comprises a generator and a discriminator. The generator can generate synthetic data, and the discriminator can determine whether the synthetic data represents a desired parameter such as a facial expression (a true) or does not represent such a parameter (a false). The generating and the discriminating can be used to optimize the GAN. Embodiments include jointly optimizing the GAN, where the generator and the discriminator can both be optimized. In other embodiments, the at least one GAN can be driven by a latent random variable. A latent random variable can be inferred based on a mathematical model. In the context of the flow 900, the latent random variable can be targeted for a sparse facial expression within the training dataset. The sparse facial expression can include a smile, a frown, a smirk, a neutral expression, etc. In other embodiments, the sparse facial expression can comprise a yawn.

Various techniques can be used for optimizing the GAN, including jointly optimizing the generator and the discriminator. In embodiments, the joint optimization of the GAN comprises a loss feedback to the discriminator and to the generator. In the context of a neural network, a "candidate solution" for a trained neural network can include a set of weights associated with nodes within layers of the neural network. A function such as an objective function can be used to evaluate the candidate solution. The candidate solution can be evaluated or ranked based on a score such as a high score, a low score, and so on. The score can be determined based on minimizing an error, where the minimizing error can be based on a cost function or a loss function. The result of evaluating the loss function can be referred to as the "loss". By feeding the loss back to both the generator and the discriminator, the loss can be minimized and the GAN optimized. The optimizing of the GAN can include locking the generator based on a result of the joint optimization. That is, the weights or other parameters associated with the generator can be locked while the loss is fed back to the discriminator. In embodiments, optimizing the GAN can include locking the discriminator based on a result of the joint optimization. An objective of the optimization can include reducing computational complexity associated with computing the generator neural network or the discriminator neural network. An efficiency value or number can be assigned to a result of the neural network computing. In embodiments, the result comprises a generator efficiency number. Note that the generator for generating synthetic data can include a random generator or a pseudo-random generator. In embodiments, the generating synthetic data is accomplished using a non-random generator.

The flow 900 includes filtering the synthetic data 940. The filtering of the synthetic data can be based on the type of facial expression represented by the synthetic data. The flow 900 includes rejecting at least one training dataset image 942 generated by the at least one GAN. The rejecting the at least one training dataset image can include removing the image from the dataset, deleting the image, and so on. The rejecting the at least one training dataset image can be based on a value, a threshold, a percentage, and the like. In embodiments, the filtering can be performed before augmenting the training dataset, as discussed below. The filtering can be accomplished using an algorithm, a function, a procedure, etc. In embodiments, the filtering can be performed using a human-based scoring process 944. The people involved in the scoring can be trained personnel who can evaluate an image for a facial expression.

The flow 900 includes tagging the synthetic data with metadata 950. The metadata can include training data labeling, a log file, etc. The metadata can include versioning information on the synthetic data. The versioning information can include data ownership and data lineage. The version information can provide training data traceability. The flow 900 includes propagating the metadata 952 to the training dataset that was augmented. The metadata that can be propagated can include labeling or log file metadata. The metadata can also include information related to data ownership, data lineage, or training data traceability, etc. The flow 900 includes augmenting the training dataset 960 using the synthetic data from the at least one GAN. The synthetic data that can be used for the augmenting can include all of the synthetic data generated by the GAN, a portion of the synthetic data, the synthetic data that remains after the filtering, and so on. The flow 900 includes augmenting the training dataset using non-GAN synthetic data 970. The non-GAN synthetic data can include data uploaded by a user. The synthetic data can further be downloaded from a library, repository, cloud-based storage, and so on. The non-GAN synthetic data can include images that can be selected by human experts, researchers, etc.

The flow 900 includes training a second neural network 980 using the training dataset that was augmented. The second neural network can include a "test" neural network that is being trained, a "production" neural network, and so on. The production neural network can be loaded with weights, biases, and so on that were learned by training the test neural network or other trained neural network. In embodiments, the first neural network and the second neural network can be implemented on the same machine learning system. The first neural network and the second neural network can be operated dependently or independently. In embodiments, the first neural network can comprise a classifier. The first neural network can be used to classify facial expressions with the facial expression training data, with production (non-training) data, and so on. The first neural network can classify facial expressions such as smiles, frowns, yawns, etc. In further embodiments, the second neural network can comprise the GAN. The second neural network can be used to generate the synthetic data.

Thus a computer-implemented method for machine learning is disclosed comprising: obtaining a facial expression training dataset for a first neural network implemented on a machine learning system; identifying one or more sparse classes of facial expressions within the training dataset; generating synthetic data to augment the sparse classes using at least one generative adversarial network (GAN); augmenting the training dataset using the synthetic data from the at least one GAN; and training a second neural network, using the training dataset that was augmented. In embodiments, the GAN comprises a generator and a discriminator. Some embodiments comprise jointly optimizing the GAN, and the jointly optimizing the GAN comprises a loss feedback to the discriminator and to the generator. Some embodiments comprise locking the generator based on a result of the joint optimization, and the result comprises a generator efficiency number.

Figure 10:
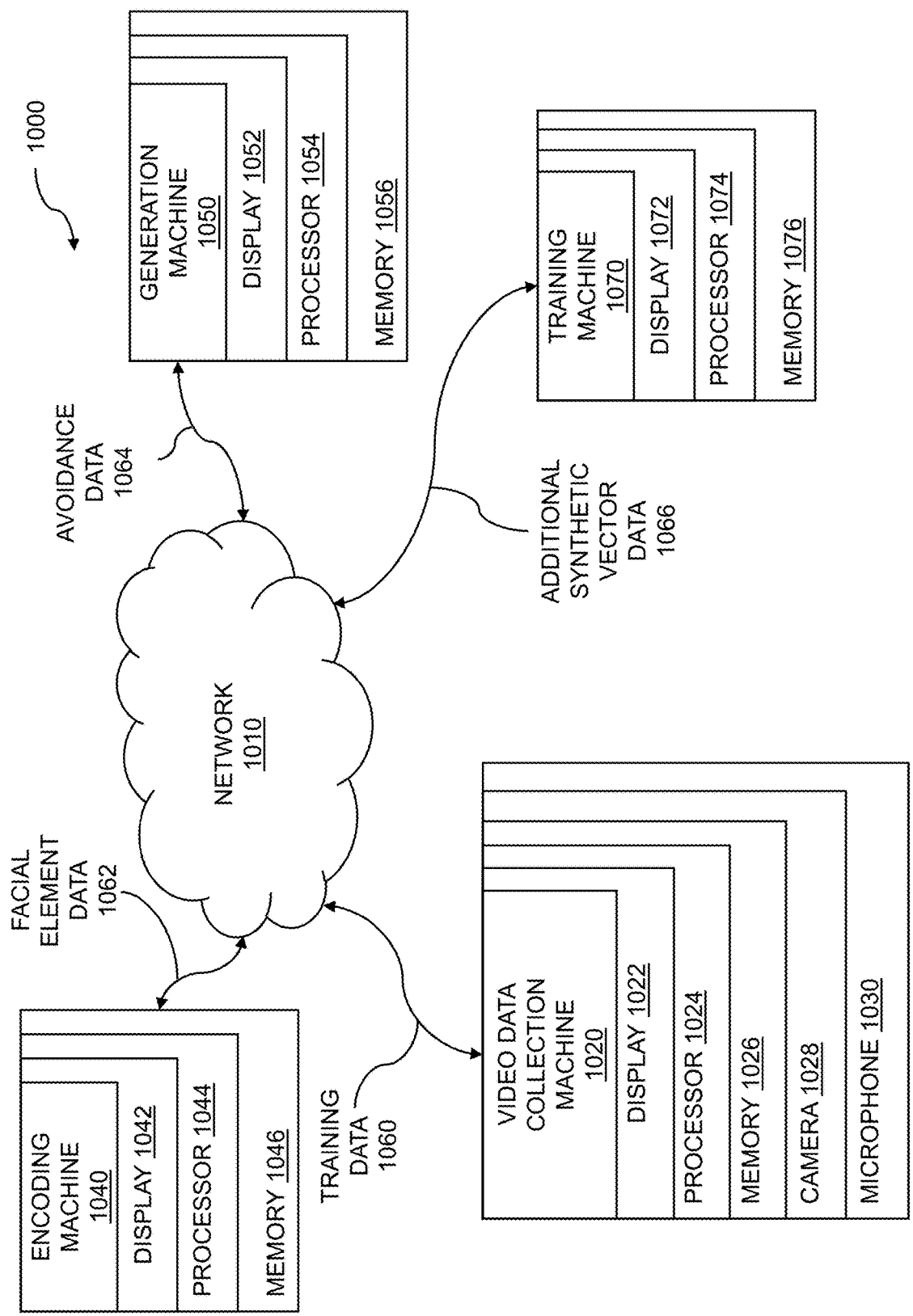
FIG. 10 is a system for synthetic data for neural network training using vectors.

FIG. 10 is a system for synthetic data for neural network training using vectors. Machine learning can be accomplished using one or more computers or processors on which a neural network can be executed. An example system 1000 which can perform machine learning is shown. The neural network for machine learning can include a machine learning neural network, a deep learning neural network, a convolutional neural network, a recurrent neural network, and so on. The system 1000 can include a memory which stores instructions and one or more processors attached to the memory, wherein the one or more processors, when executing the instructions which are stored, are configured to: obtain facial images for a neural network training dataset; encode facial elements from the facial images into one or more vector representations of the facial elements; train a generative adversarial network (GAN) generator to provide synthetic vectors based on the one or more vector representations, wherein the synthetic vectors enable avoidance of discriminator detection in the GAN; generate additional synthetic vectors in the GAN, wherein the additional synthetic vectors avoid discriminator detection; and train a machine learning neural network, using the additional synthetic vectors. Embodiments include tagging the synthetic data with metadata. The metadata can include versioning information on the synthetic data. The metadata can be propagated. Embodiments of disclosed techniques include propagating the metadata to the training dataset that was augmented. The synthetic data can be filtered. Further embodiments include filtering the synthetic data by rejecting at least one training dataset vector generated by the at least one GAN. The filtering can be performed using a human-based, scoring process. The filtering can be performed before the augmenting. Embodiments include converting the additional synthetic vectors into image data. In further embodiments, the system 1000 can provide a computer-implemented method for machine learning comprising: obtaining facial images for a neural network training dataset; encoding facial elements from the facial images into one or more vector representations of the facial elements; training a generative adversarial network (GAN) generator to provide one or more synthetic vectors based on the one or more vector representations, wherein the one or more synthetic vectors enable avoidance of discriminator detection in the GAN; generating additional synthetic vectors in the GAN, wherein the additional synthetic vectors avoid discriminator detection; and training a machine learning neural network, using the additional synthetic vectors.

The system 1000 can include one or more video data collection machines 1020 linked to an encoding machine 1040, a generation machine 1050, and a training machine 1070 via a network 1010 or another computer network. The network can be wired or wireless, a computer network such as the Internet, and so on. Training data 1060 such as facial image data, facial element data, avoidance data, and so on, can be transferred to the encoding machine 1040 and to the generation machine 1050 through the network 1010. The example video data collection machine 1020 shown comprises one or more processors 1024 coupled to a memory 1026 which can store and retrieve instructions, a display 1022, a camera 1028, and a microphone 1030. The camera 1028 can include a webcam, a video camera, a still camera, a thermal imager, a CCD device, a phone camera, a three-dimensional camera, a depth camera, a light field camera, multiple webcams used to show different views of a person, or any other type of image capture technique that can allow captured data to be used in an electronic system. The microphone can include any audio capture device that can enable captured audio data to be used by the electronic system. The memory 1026 can be used for storing instructions, video data including facial images, facial expression data, etc. on a plurality of people; audio data from the plurality of people; one or more classifiers; and so on. The display 1022 can be any electronic display, including but not limited to, a computer display, a laptop screen, a netbook screen, a tablet computer screen, a smartphone display, a mobile device display, a remote with a display, a television, a projector, or the like.

The encoding machine 1040 can include one or more processors 1044 coupled to a memory 1046 which can store and retrieve instructions, and can also include a display 1042. The encoding machine 1040 can receive the training data 1060 and can encode facial elements from the facial images into one or more vector representations of the facial element data 1062. The facial element data can include a smile, frown, or smirk of varying intensities; eyebrow furrows; and so on. A value can be determined for the facial elements. In a usage example, a value can be determined for a strong smile, a moderate smile, a weak smile, and so on. Values can similarly be determined for other facial elements. The values that are determined can be used as elements within one or more vector representations. The vector representations can be used to train a generative adversarial network (GAN) generator to provide synthetic vectors based on the one or more vector representations. The synthetic vectors can enable avoidance of discriminator detection in the GAN, where avoidance of discriminator detection indicates that the discriminator was unable to accurately determine whether the synthetic vectors were real vectors or synthetic vectors.

The generation machine 1050 can include one or more processors 1054 coupled to a memory 1056 which can store and retrieve instructions, and can also include a display 1052. The generation machine 1050 can receive the training data 1060 and facial element data 1062, and can generate additional synthetic vectors in the GAN. The additional synthetic vectors can avoid discriminator detection. The generation can include at least one generative adversarial network (GAN), where a GAN can comprise a generator and a discriminator. The generator can generate data such as synthetic data, where the synthetic data can include the synthetic vectors. The discriminator can determine whether the results of generation are true or false. Embodiments include jointly optimizing the GAN, where jointly optimizing the GAN includes a loss feedback to the discriminator and to the generator. The generation machine 1050 can use training data received from the video data collection machine 1020 to produce avoidance data 1064. In some embodiments, the generation machine 1050 receives training data from a plurality of video data collection machines, aggregates the training data, processes the training data or the aggregated training data, and so on.

The training machine 1070 can include one or more processors 1074 coupled to a memory 1076 which can store and retrieve instructions and data, and can also include a display 1072. The training that can be accomplished by the training machine can include training a machine learning neural network using additional synthetic vectors. The training can be based on avoidance data 1064, where the avoidance data can include facial element training data, classifiers, generated synthetic vectors, and so on. The training can occur on the training machine 1070 or on a machine or platform different from the training machine 1070. The training can be based on additional synthetic vector data 1066. In embodiments, the training of the neural network based on the avoidance data occurs on the video data collection machine 1020, the encoding machine 1040, or on the generation machine 1050. As shown in the system 1000, the training machine 1070 can receive the avoidance data 1064 via the network 1010, the Internet, or another network, from the video data collection machine 1020, from the encoding machine 1040, from the generation machine 1050, or from all. The training data can be shown as a visual rendering on a display or any other appropriate display format.

The system 1000 can include a computer program product embodied in a non-transitory computer readable medium for machine learning, the computer program product comprising code which causes one or more processors to perform operations of: obtaining facial images for a neural network training dataset; encoding facial elements from the facial images into one or more vector representations of the facial elements; training a generative adversarial network (GAN) generator to provide synthetic vectors based on the one or more vector representations, wherein the synthetic vectors enable avoidance of discriminator detection in the GAN; generating additional synthetic vectors in the GAN, wherein the additional synthetic vectors avoid discriminator detection; and training a machine learning neural network, using the additional synthetic vectors.

Each of the above methods may be executed on one or more processors on one or more computer systems. Each of the above methods may be implemented on a semiconductor chip and programmed using special purpose logic, programmable logic, and so on. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for machine learning comprising:
   obtaining facial images for a neural network training dataset;
   encoding facial elements from the facial images into one or more vector representations of the facial elements using a machine learning neural network;
   training a generative adversarial network (GAN) generator to provide one or more synthetic vectors based on the one or more vector representations, wherein a feature selector selects values from the one or more vector representations, the values being used as an input to the GAN, and wherein the one or more synthetic vectors enable avoidance of discriminator detection in the GAN;
   generating additional synthetic vectors in the GAN, wherein the additional synthetic vectors avoid discriminator detection; and
   further training the machine learning neural network, using the additional synthetic vectors that were generated by the GAN based on the selected values of the feature selector.

2. The method of claim 1 wherein the training a machine learning neural network further comprises using the one or more synthetic vectors.

3. The method of claim 1 wherein the training a GAN further comprises determining a generator accuracy using the discriminator.

4. The method of claim 3 wherein the generator accuracy is a criterion for the generating additional synthetic vectors.

5. The method of claim 3 wherein the generator accuracy enables a classifier.

6. The method of claim 1 further comprising backpropagating an error function into the discriminator.

7. The method of claim 6 wherein the error function is determined on a real/fake basis.

8. The method of claim 1 wherein the facial elements comprise human drowsiness features.

9. The method of claim 8 wherein the human drowsiness features are distilled into n-element vectors.

10. The method of claim 9 wherein n is equal to a number of facial element features times a number of statistics for each feature.

11. The method of claim 10 wherein the number of facial element features is 18 and the number of statistics is 6, and thus n is equal to 108.

12. The method of claim 8 wherein the training a GAN and generating additional synthetic vectors enable a drowsiness detection neural network.

13. The method of claim 1 further comprising filtering the synthetic vectors by rejecting at least one training dataset vector generated by the GAN.

14. The method of claim 1 further comprising converting the additional synthetic vectors into image data.

15. The method of claim 14 further comprising augmenting the neural network training dataset using the image data converted from the additional synthetic vectors.

16. The method of claim 15 wherein filtering is performed before the augmenting.

17. The method of claim 1 wherein the GAN is seeded by a latent random variable.

18. The method of claim 17 wherein the latent random variable is targeted for a sparse facial expression within the training dataset.

19. The method of claim 18 wherein the sparse facial expression comprises a drowsiness state.

20. The method of claim 19 wherein the drowsiness state comprises one of a slightly drowsy state, a moderately drowsy state, or an extremely drowsy state.

21. The method of claim 19 wherein the drowsiness state comprises a non-alert state.

22. The method of claim 1 further comprising tagging the synthetic vectors with metadata.

23. The method of claim 22 further comprising propagating the metadata to a training dataset.

24. A computer-implemented method for machine learning comprising:

obtaining a facial expression training dataset for a first neural network implemented on a machine learning system;

identifying one or more sparse classes of facial expressions within the training dataset;

generating synthetic data to augment the sparse classes using at least one generative adversarial network (GAN), wherein a feature selector selects values from one or more vector representations, the values being used as an input to the GAN;

augmenting the training dataset using the synthetic data from the at least one GAN based on the selected values of the feature selector; and training the machine learning system, using the training dataset that was augmented.

25. A computer system for machine learning comprising:

a memory which stores instructions;

one or more processors attached to the memory wherein the one or more processors, when executing the instructions which are stored, are configured to:

obtain facial images for a neural network training dataset;

encode facial elements from the facial images into one or more vector representations of the facial elements using a machine learning neural network;

train a generative adversarial network (GAN) generator to provide synthetic vectors based on the one or more vector representations, wherein a feature selector selects values from the one or more vector representations, the values being used as an input to the GAN, and wherein the synthetic vectors enable avoidance of discriminator detection in the GAN;

generate additional synthetic vectors in the GAN, wherein the additional synthetic vectors avoid discriminator detection; and train the machine learning neural network, using the additional synthetic vectors that were generated by the GAN based on the selected values of the feature selector.

* * * * *